(12) United States Patent
Franklin

(10) Patent No.: US 10,812,410 B1
(45) Date of Patent: Oct. 20, 2020

(54) MACHINE LEARNING BASED SIGNAL GENERATION

(71) Applicant: Triangle IP, Inc., Englewood, CO (US)

(72) Inventor: Thomas D. Franklin, Englewood, CO (US)

(73) Assignee: Triangle IP, Inc., Englewood, CO (US)

( * ) Notice: Subject to any disclaimer, the term of this patent is extended or adjusted under 35 U.S.C. 154(b) by 0 days.

(21) Appl. No.: 16/579,575

(22) Filed: Sep. 23, 2019

Related U.S. Application Data

(63) Continuation of application No. 16/378,335, filed on Apr. 8, 2019, now Pat. No. 10,425,353, which is a continuation-in-part of application No. 16/119,901, filed on Aug. 31, 2018, now Pat. No. 10,257,116, which is a continuation of application No. 15/882,948, filed on Jan. 29, 2018, now Pat. No. 10,069,759.

(60) Provisional application No. 62/535,456, filed on Jul. 21, 2017, provisional application No. 62/451,373, filed on Jan. 27, 2017, provisional application No. 62/830,979, filed on Apr. 8, 2019, provisional application No. 62/831,025, filed on Apr. 8, 2019, provisional application No. 62/824,172, filed on Mar.
(Continued)

(51) Int. Cl.
| | | |
|---|---|---|
| *G06F 15/173* | (2006.01) | |
| *H04L 12/911* | (2013.01) | |
| *G06N 20/00* | (2019.01) | |
| *H04L 12/24* | (2006.01) | |
| *H04L 12/26* | (2006.01) | |
| *G06N 5/04* | (2006.01) | |

(52) U.S. Cl.
CPC ............ *H04L 47/823* (2013.01); *G06N 5/04* (2013.01); *G06N 20/00* (2019.01); *H04L 41/0896* (2013.01); *H04L 41/12* (2013.01); *H04L 41/147* (2013.01); *H04L 43/045* (2013.01); *H04L 41/16* (2013.01)

(58) Field of Classification Search
None
See application file for complete search history.

(56) References Cited

U.S. PATENT DOCUMENTS

| | | | | |
|---|---|---|---|---|
| 6,219,649 B1 * | 4/2001 | Jameson | ............... | G06Q 10/06 |
| | | | | 705/7.12 |
| 8,560,465 B2 * | 10/2013 | Jeong | ..................... | G06N 5/02 |
| | | | | 706/12 |

(Continued)

*Primary Examiner* — Mohamed Ibrahim
(74) *Attorney, Agent, or Firm* — Thomas D. Franklin

(57) ABSTRACT

The present disclosure uses input signals from different sources to fill gaps in the desired signal, for example a heat score signal. Different input signals are categorized so that they can be matched to a desired category of the desired signal. The various signals can be represented in vector format using category tags, for example. There are different latencies for each input signal that is aligned in time with the desired signal. Also, the match to the desired signal may vary from the input signals so that each desired signal's contribution during the gap is weighted accordingly. A composite signal is formulated from the time-adjusted and weighted input signals to fill the gap in the desired signal. Over time, the weighting and time-adjustment for each input signal can be modified with a learning algorithm that takes the approximation during the gap and compares it later with the actual data once the gap is filled in one embodiment.

5 Claims, 18 Drawing Sheets

Related U.S. Application Data

26, 2019, provisional application No. 62/726,951, filed on Sep. 4, 2018.

(56) References Cited

U.S. PATENT DOCUMENTS

| | | | |
|---|---|---|---|
| 2002/0107914 A1* | 8/2002 | Charisius | G06Q 10/10 709/203 |
| 2014/0055458 A1* | 2/2014 | Bogdany | H04L 41/142 345/440 |
| 2015/0160979 A1* | 6/2015 | Moffitt | G06F 9/5066 718/104 |

\* cited by examiner

| Docket Number | | Title | | ~1202 |

Inventor Details
Assignee Details ~1204

Law Firm Details
Attorney Details ~1206

~1200

Select an Audio File — Upload
Select a Text File — Upload — Submit ~1208

Summary
[ Submit ] ~1210

Heat Score 🔥🔥🔥 ~1212

| File By | YYYY-MM-DD |
| Predicted Art Unit | AU-1234 | ~1214

FIG. 12

MACHINE LEARNING BASED SIGNAL GENERATION

CROSS-REFERENCE TO RELATED APPLICATIONS

This application is a continuation of U.S. patent application Ser. No. 16/378,335, filed on Apr. 8, 2019; which application is a continuation-in-part of U.S. patent application Ser. No. 16/119,901, filed on Aug. 31, 2018, now U.S. Pat. No. 10,257,116, issued on Apr. 9, 2019; which application is a continuation of U.S. patent application Ser. No. 15/882,948, filed on Jan. 29, 2018, now U.S. Pat. No. 10,069,759, issued on Sep. 4, 2018; which application claims the benefit of and is a non-provisional of both U.S. Provisional Application No. 62/535,456, filed on Jul. 21, 2017, and U.S. Provisional Application No. 62/451,373, filed on Jan. 27, 2017; which are all hereby expressly incorporated by reference in their entirety for all purposes.

This application is a continuation of U.S. patent application Ser. No. 16/378,335, filed on Apr. 8, 2019; which application claims the benefit of and is a non-provisional of U.S. Provisional Application No. 62/830,979, filed on Apr. 8, 2019; U.S. Provisional Application No. 62/831,025, filed on Apr. 8, 2019; U.S. Provisional Application No. 62/824,172, filed on Mar. 26, 2019; and U.S. Provisional Application No. 62/726,951, filed on Sep. 4, 2018; which are each expressly incorporated by reference in their entirety for all purposes.

BACKGROUND

This disclosure relates in general to machine learning systems and, but not by way of limitation, to automatic patent management system amongst other things.

There are many issues with allocation of resources. Recently, the availability of large historical data sets of past allocations of resources allows big data analysis. These data sets are vast, but difficult to gather meaningful insights. Often these data sets are protected with authentication and are not friendly to machine learning algorithms.

Machine learning algorithms have difficulty gathering meaningful insights for unstructured data sets. This is especially true for transactional web sites primarily structured for human interaction. Web sites designed for human interaction without any machine data transfer capability are notoriously difficult to use for gathering big data.

SUMMARY

In one embodiment, the present disclosure uses input signals from different sources to fill gaps in the desired signal, for example a heat score signal. Different input signals are categorized so that they can be matched to a desired category of the desired signal. The various signals can be represented in vector format using category tags, for example. There are different latencies for each input signal that is aligned in time with the desired signal. Also, the match to the desired signal may vary from the input signals so that each desired signal's contribution during the gap is weighted accordingly. A composite signal is formulated from the time-adjusted and weighted input signals to fill the gap in the desired signal. Over time, the weighting and time-adjustment for each input signal can be modified with a learning algorithm that takes the approximation during the gap and compares it later with the actual data once the gap is filled in one embodiment.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and various ways in which it may be practiced.

FIG. 12 illustrates a GUI associated with a patent management system, according to another embodiment of the present disclosure.

In the appended figures, similar components and/or features may have the same numerical reference label. Further, various components of the same type may be distinguished by following the reference label with a letter or by following the reference label with a dash followed by a second numerical reference label that distinguishes among the similar components and/or features. If only the first numerical reference label is used in the specification, the description is applicable to any one of the similar components and/or features having the same first numerical reference label irrespective of the suffix.

DETAILED DESCRIPTION OF THE INVENTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1:
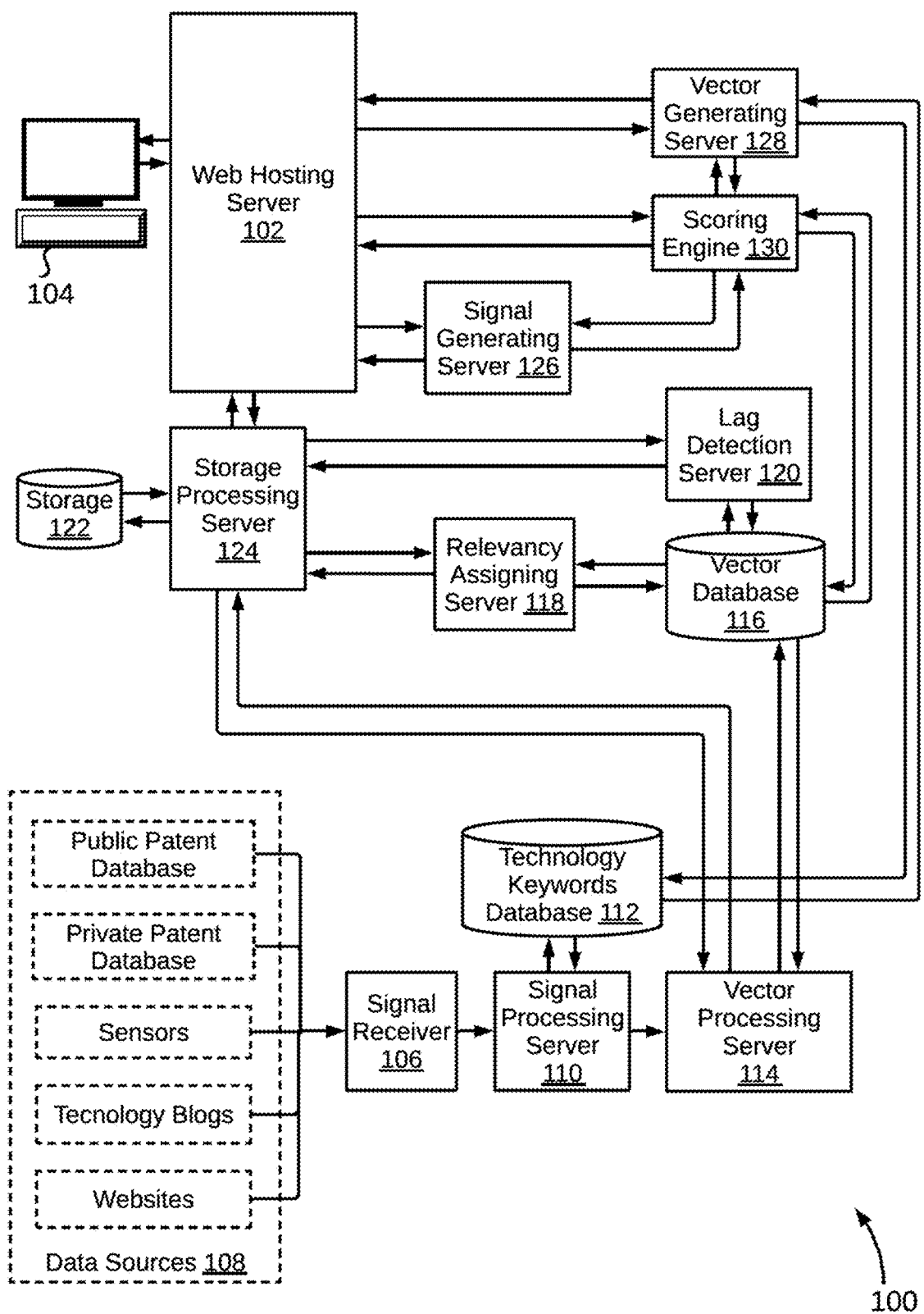
FIG. 1 illustrates a patent management system configured to generate signals associated with patent data, according to an embodiment of the present disclosure.

FIG. 1 illustrates a patent management system 100 configured to generate signals associated with patent data, according to an embodiment of the present disclosure. The patent management system 100 includes a web hosting server 102 for hosting a web page and/or GUI through which a user device 104 or many user devices 104 (not shown) may interact. The user device 104 interacts with the web hosting server 102 via the internet or via some other type of network, e.g., local area network (LAN), wide area network (WAN), cellular network, personal area network (PAN), etc. The web hosting server 102 provides a software as a service (SaaS) delivery model in which the user device 104 accesses software via a web browser in a zero footprint configuration for the user device 104, but other embodiments could use enterprise software, handheld app or computer application software. The web hosting server 102 allows the user device 104 to download and/or install software that permits the user device 104 to use the patent management system 100. A web browser in the zero footprint configuration downloads software to work in conjunction with software on the web hosting server 102 to provide the functionality.

The patent management system 100 may include a signal receiver 106 that receives a plurality of signals from one or more of data sources 108. Each of the plurality of signal may include technology or patent related data. The data sources 108 may include websites, technology blogs or forums, sensors, private patent database (authenticated data source), or a public patent database (un-authenticated data source). Websites may be technology oriented and may include various technology related articles, publications, promotions, or whitepapers. The websites may be that of institutes of technology, technology organizations or associations (for example, IEEE®, IET®, INTERNET SOCIETY®, SILICON INTEGRATION INITIATIVE®, or TED®), technology companies (for example, IBM®, QUALCOMM®, APPLE®, SAMSUNG®, TEXAS® INSTRUMENTS®, or TESLA®), technology hosting servers (for example, GITHUB®, BITBUCKET®, GITLAB®, ASSEMBLA®, or BEANSTALK®), or technology repositories (SSRN®, SCIENCEDIRECT®, or TECHREPUBLIC®).

Technology blogs or forums may be used by technologist to discuss upcoming technology trends and/or to post technology related content. Examples may include, but are not limited to the NEXT WEB®, SMASHING MAGAZINE®, TECHCRUNCH®, THE VERGE®, MASHABLE®, WIRED®, ENGADGET®, or DIGITAL TRENDS®. Sensors may also be used to capture technology specific information. By way of an example, microphones may be installed in areas where the probability of people discussing about upcoming technologies is high. Examples of such areas may include, but are not limited to corporate lounges in the airport, common areas in institutes of technology, or conference halls where technology related conferences are held.

Patent filing activity is a decisive indicator of current and/or upcoming technology trends. Thus, private and public patent databases are also used as a source of signals. The private and public patent databases may include administrative data related to patents. Examples may include, but are not limited to the Public or Private Patent Application Information Retrieval (PAIR) server hosted by the United States Patent and Trademark Office (USPTO). The public patent database (for example, the Public PAIR) may have public filings listed without full availability, but the private patent database (for example, the Private PAIR) may have more complete access with the ability to download electronic copies for a specific account. In a specific scenario, the USPTO may publish a report that includes data related to patent filings with the USPTO per Technology Centre (TC) and per Art Unit (AU) in last three months. The report may be published after a period of three months on the USPTO website.

For managing filing and prosecution of patent applications, the USPTO has divided technologies into nine TCs, such that each TC is associated with a broad technology category. The nine TCs include TC-1600 which is related to biotechnology and organic field, TC-1700 which is related to chemical and materials engineering fields, TC-2100 which is related to computer architecture software and information security, TC-2400 which is related to computer networks, multiplex, cable and cryptography/security, TC-2600 which is related to communications, TC-2800 which is related to semiconductors, electrical and optical systems and components, TC-2900 which is related to designs, TC-3600 which is related to transportation, electronic commerce, construction, agriculture, licensing and review, and TC-3700 which is related to mechanical engineering, manufacturing, and products. Each TC is further divided into multiple AUs and each AU corresponds to a technology sub-category within the broad technology category of the associated TC. An AU further has Examiners who may examine applications that are assigned under that AU. By way of an example, the TC 2400, amongst other AUs, includes AU 2431 and AU 2433 to AU 2439. Similarly, the TC 3600, amongst other AUs, includes the AU 3681 to AU 3689.

The private patent database may also be a local database that is available within the patent management system 100. The local database, for example, may include a list of invention disclosure forms (or related content) submitted by various clients, via, their respective accounts on the patent management system 100.

In an embodiment, the signal receiver 106 may employ one or more of a web crawler, a data miner, a feed processor, and a subscription processor (for example, emails or other type of messages), which may be used to retrieve signals from one or more of the data sources 108. The signal receiver 106 may retrieve signals either continuously, periodically, or when prompted by another component within the patent management system 100 to do so. For example, prior to any process being performed within the patent management system 100 that uses data extracted from signals, the signal receiver 106 may be prompted to verify that data extracted from the signals is current and that no new signals have been generated from one or more of the data source 108. After receiving a signal, the signal receiver 106 identifies a source and a publication date for the signal either based on the associated metadata or based on the content within the signal. The signal receiver 106 then assigns and appends source and publication date tags to the each of the plurality of signals. The signal receiver 106 is explained in detail in reference to FIG. 2.

The patent management system 100 further includes a signal processing server 110 that receives tagged signals from the signal receiver 106. Various components within the signal processing server 110 are explained in detail in reference to FIG. 2. The signal processing server 110 filters out redundant data from each signal in order to extract the relevant data. The signal processing server 110 may extract multiple sets of relevant data from each signal. By way of an example, a signal received from a blog may include relevant data related to two different technologies. In this case, the signal processing server 110 may extract relevant data for the first technology separately from the relevant data for the second technology. The signal processing server 110 then assigns technology tags to the relevant data thus extracted. In order to assign technology tags, the signal processing server 110 is communicatively coupled to a technology keywords database 112. The technology keywords database 112 may be a hierarchical database that includes various keywords (and their alternatives) associated with multiple technology fields. The first level in the hierarchical database may include keywords associated with a main technology category, and subsequent levels for each main technology category may include keywords associated with granular technology categories. The granularity in the technology categories may keep on increasing based on the hierarchy level. In other words, at each subsequent hierarchy level, the number of technology categories may increase. In an embodiment, the hierarchy levels in the technology keywords database 112 may be based on the TCs and the corresponding mapped AUs as defined at the USPTO.

By way of an example, for a main technology category of "communications" the multiple levels in the hierarchical database may be represented using table 1:

TABLE 1

| Hierarchy Level | Technology Category | Relevant Keywords |
|---|---|---|
| First level | Communications | xyz, abc, 123 |
| Second level | Wireless communications | xyz, abc, 456 |
| Third level | Third Generation (3G) | xyz, 123, abc |
| Third level | Fourth Generation (4G) | xyz, abc, 789 |
| Third level | Fifth Generation (5G) | xyz, 456, abc, |

The signal processing server 110 may compare the extracted relevant data with keywords in the technology keywords database 112 to the most granular level in order to identify a relevant technology category for the extracted relevant data. In an embodiment, the signal processing server 110 may compare the extracted relevant data with keywords for the technology categories at the last hierarchy level of each main technology category. By way of an example and referring to the table 1, extracted relevant data may be compared with keywords associated with the technology categories at the third level, i.e., 3G, 4G, and/or 5G. The relevant technology category is identified for the extracted relevant data, when the similarity score determined for the keywords associated with the relevant technology category, when compared with the extracted relevant data is greater than a predefined threshold score. Thus, in an embodiment, multiple relevant technology categories or sub-categories may be identified for the extracted relevant data. In continuation of the example above, both 4G and 5G may be identified as relevant technology categories for the relevant extracted data.

In an alternate embodiment, a signal may already include specific details related to a relevant technology with which the signal is associated. By way of an example, a signal received from the USPTO website may include the AU and/or TC number along with number of patent filings in that AU and/or TC. Thus, in this case, as details related to the relevant technology category (through AU and/or TC number) is already available in the signal, the signal processing server 110 may not require to compare the extracted relevant data with keywords in the technology keywords database 112.

Once the signal processing server 110 identifies one or more relevant technology categories for the relevant extracted data, the signal processing server 110 may append these relevant technology categories to the relevant extracted data as metadata. Thereafter, the signal processing server 110 may forward the relevant extracted data, which is now appended with metadata associated with relevant technology category, the source, and the publication date, to a vector processing server 114.

The vector processing server 114 generates a plurality of vectors based on the relevant extracted data for each of the plurality of signals. For a given relevant extracted data, the vector processing server 114 may generate two or more vectors. The plurality of vectors are data structures that include one or more nodes with defined spacing between them. A vector is generated, such that, each node in the vector corresponds to a measure of innovation activity associated with a particular technology. The measure of innovation activity, for example, may be based on the number of patent filings. The spacing between two adjacent node represent time separation between these two node. The time separation may be on monthly, quarterly, or yearly basis. By way of an example, a first node may represent innovation activity for the month of April in a given year and a succeeding node may represent innovation activity for the month of May. In addition to generating the plurality of vectors, the vector processing server 114 may also assign one or more tags to each of the plurality of vectors. The one or more tags may include a source tag, a technology tag, and/or a date tag. Generation of vectors and assignment of tags is further explained in detail in reference to FIG. 2. The vector processing server 114 stores the plurality of vectors along with associated tags in a vector database 116. One or more vectors may later be retrieved from the vector databases 116 along with the associated tags. The plurality of vectors are depicted in greater detail in reference to FIG. 9.

In an embodiment, the plurality of vectors may be categorized as public vectors and private vectors based on the type of source associated with the vectors. A public vector may be generated corresponding to a signal received from a data source that is public (for example, USPTO website). On the contrary, a private vector may be generated corresponding to a signal received from a data source that is private. Private vectors are designed to match the scope of access to a user from the private data source, but may expand to a larger group of users, for example, attorney access to patent filing document could be shared with other users of the web hosting server 102 from the same company and/or law firm. Domains within any group may be designed to accommodate corporate, government or other classification levels to limit access to private vectors.

Each of the plurality of vectors may be accessed from the vector database 116 by a relevancy assigning server 118 and/or a lag detection server 120. The relevancy assigning server 118 may assign relevancy weights to each vector based on the appended source and technology tags. The source associated with a vector is a decisive factor in to establish the importance of the vector in determining innovation activity for a given technology, as the source may indicate the accuracy of the data in the vector. By way of an example, a vector which is tagged with USPTO as the source may be given the highest weightage, while a vector which is tagged with a technology blog as the source may be given the lowest weightage. The relevancy assigning server 118 is further explained in detail in reference to FIG. 3.

Each signal may have a time-lag, which is the difference between the date of availability/publication of the signal in public domain and the actual date of innovation activity that was deciphered from the signal. Thus, the lag detection server 120 may determine a relevant time period associated with each of the plurality of vectors. The lag detection server 120 is further explained in detail in reference to FIG. 4. After a vector has been processed by the relevancy assigning server 118 and the lag detection server 120, the vector is assigned a relevancy weight and a relevant time period. In an embodiment, the relevancy weight may be appended to the vector as a tag, while the relevant time period may be used to the replace the time tag already appended to the vector.

The relevancy assigning server 118 and/or the lag detection server 120 store each of the plurality of vectors in a storage 122, via a storage processing server 124. The storage 122 also includes user-specific information generated by and/or uploaded to the patent management system 100. The storage 122 differs from the vector database 116 in several respects. First, the storage 122 may include user-specific information (e.g., private vectors) that a user may want to keep private outside of a defined domain. Second, access to the storage 122 may require user authentication, whereas access to the vector database 116 does not require user authentication. Third, the storage 122 does not exclusively include vectors but may include other information, such as, user preferences, authenticated database login information and credentials, trade secret information, augments to the authentication data, and/or allocation rules. Contents of the storage 122 are described in greater detail in reference to FIG. 5. The storage 122 may be geofenced to a defined country or countries, stored in the cloud, stored behind a user's firewall, or/and stored on the user device 104. The patent management server 100 may include storage in addition to the storage 122. Additionally, the storage 122 may be divided into any number of divisions and these divisions may be physical or logical in various embodiments, for example, a user may wish that the information in their domain be stored on storage of their choice.

The storage processing server 124 may maintain the storage 122, maintain domains and otherwise control access. The storage processing server 124 may serve two purposes. First, the storage processing server 124 identifies and selects the proper storage that a storage requestor is requesting access to, e.g., the storage 122. Second, the storage processing server 124 may verify that the storage requestor has the proper authentication to access the specific storage being requested. The storage processing server 124 separately receives vectors processed by the relevancy assigning server 118 and the lag detection server 120. Thus, the storage processing server 124 receives the same vector twice, once tagged with a relevancy weight and then tagged with relevant time period. The storage processing server 124 then combines the two vectors that are same, such that, only one vector tagged with both the relevancy weight and the relevant time period, is stored in the storage 122. The storage processing server 124 is described in greater detail in reference to FIG. 4.

The patent management system 100 includes a signal generating server 126 that is communicatively coupled to the web hosting server 102 and may thus communicate with other servers and engines communicatively coupled to the web hosting server 102. The signal generating server 126 generates a time mapped signal based on a subset of vectors that are associated with a particular technology field. Each vector in the subset of vectors has a technology tag that may be associated with the particular technology field. In other words, the signal generating server 126 determines a technology field and extracts the subset of vectors from the storage 122, via the storage processing server 124, based on the technology tag appended to each vector in the subset.

The technology field for which the time mapped signal is to be generated, may be identified based on an input received from the user. The time mapped signal is generated based on the relevancy weight and the relevant time period assigned to each vector in the subset. In other words, the signal generating server 126 may combine the vectors in the subset in accordance with the relevancy weights to determine relevant innovation activity and in accordance with the relevant time period to determine distribution or placement of the combined vector across a timeline. The signal generating server 126 is described in greater detail in reference to FIG. 4.

The patent management system 100 includes a vector generating server 128 that is communicatively coupled to the web hosting server 102. A user, via the user device 104, may provide an invention idea as a user input to the patent management system 100. The user may provide the invention idea by writing content on a Graphical User Interface (GUI), by uploading a file that includes the invention idea, or by providing a voice input (which may be recorded earlier or inputted in real-time). The user input may be received by the vector generating server 128 that creates an input vector based on the user input. The vector generating server 128 is described in greater detail in reference to FIG. 7.

The vector generating server 128 provides the input vector to a scoring engine 130 that is communicatively coupled to the web hosting server 102. The scoring engine 130 compares the input vector with the plurality of vectors stored in the storage 122, via the web hosting server 102 and the storage processing server 124, and extracts matching vectors. The scoring engine 130 then shares the matched vectors with signal generating server 126, which generates a time mapped signal for the matching vectors. The scoring engine 130 then covers the time mapped signal to a heat score. The heat score is reflective of the current innovation activity in the technology field related to the invention idea submitted by the user. Thus, the heat score provides an indication to the user, as to how soon the user should file a patent application for the invention idea. The heat score may also provide an indication that the user should not file a patent application. In addition to the heat score, the score engine 130 may also indicate the date by which a patent application should be filed for the invention idea. In an embodiment, the scoring engine 130 may generate the heat score independently, without receiving the time mapped signal from the signal generating server 126. The scoring engine 130 is described in greater detail in reference to FIG. 8.

These various servers may be collocated or spread across the Internet or a WAN. Functions assigned to one server, database or block may be combined with others or separated in different embodiments.

Figure 2:
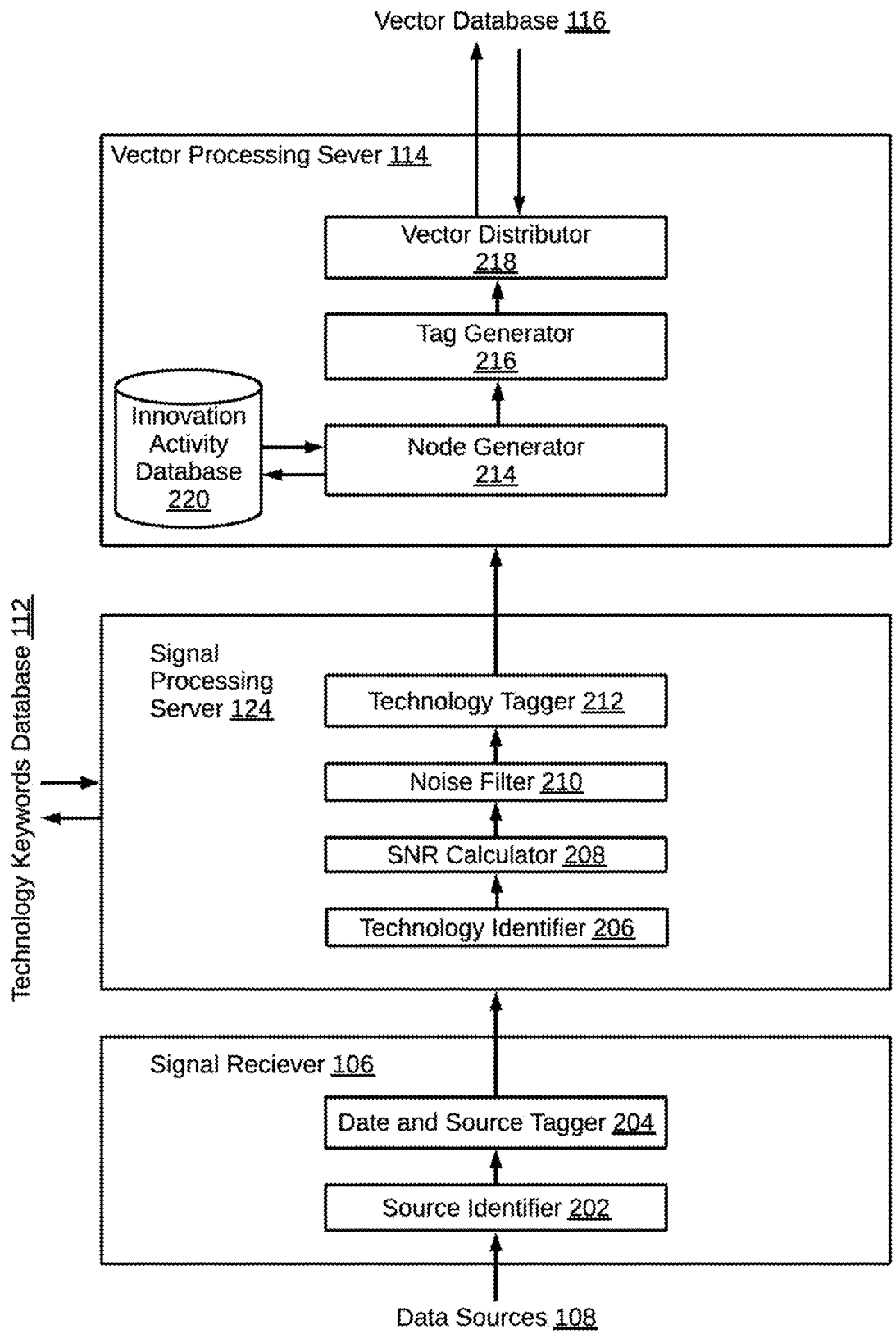
FIG. 2 illustrates communication between a signal receiver, a signal processing server, and a vector processing server, according to an embodiment of the present disclosure.

FIG. 2 illustrates communication between the signal receiver 106, the signal processing server 110, and the vector processing server 114, according to an embodiment of the present disclosure. The signal receiver 106 receives a plurality of signals from one or more of the data sources 108. Each of the plurality of signal may include technology or patent related data. The signal receiver 106 may employ one or more of a web crawler, a data miner, a feed processor, and a subscription processor (for example, emails or other type of messages) which may be used to retrieve signals from one or more of the data sources 108. The signal receiver 106 may retrieve signals either continuously, periodically, or when prompted by another component within the patent management system 100 to do so. In some embodiments, one or more of the data sources 108 may be configured for human access to information, thus a typical machine to machine transfer of information requires the signal receiver 106 to spoof a user account. Alternatively, the signal receiver 106 may include APIs and/or protocols to facilitate retrieval of signals.

The signal receiver 106 includes a source identifier 202 and a date and source tagger 204. The source identifier 202 identifies a source and a publication date for a signal. The source identifier 202 may identify the source and the publication date based on metadata associated with signal. Alternatively, to this end, the source identifier 202 may analyze the content within the signal. By way of an example, for a signal associated with a published article, the publication date and source of publication may be provided within the published article. In an embodiment, if the publication date and the source of a signal cannot be identified through metadata or inline content, the source identifier 202 may make a determination based on publication date and source of neighboring signals that immediately succeed or precede the signal.

Once the publication date and the source of the signal are identified, the date and source tagger 204 assigns and appends source and date tags to the signal. By way of an example, a signal received from USPTO, which was published online on 5 May 2018, may be assigned a USPTO tag and a date tag of 5 May 2018. The USPTO tag and the date tag may later be used to determine relevancy of the data extracted from the signal received from the USPTO. By way of an example, the signal received from the USPTO may be assigned the highest relevancy, when compared to other signals received. The date and source tagger 204 may send the signal tagged with source and date tags to the signal processing server 124.

The signal processing server 124 includes a technology identifier 206, a Signal to Noise Ratio (SNR) calculator 208, a noise filter 210, and a technology tagger 212. The technology identifier 206 receives the signal tagged with source and date tags and determines the technology field associated with the signal. To this end, the technology identifier 206 compares the data in the signal with keywords associated with main technology categories within the technology keywords database 112. The technology identifier 206 may extract relevant words from the data in the signal based on frequency of occurrence of words and removal of stop words from the data. Examples of stop words may include, but are not limited to a, the, is, are, from, of, he, she, or we. The technology identifier 206 may include a list of stop words, which may be periodically updated.

The relevant words may be compared with keywords of each main technology category in the technology keywords database 112. In other words, keyword comparison may only be performed for the first hierarchy level in the technology keywords database 112. The main technology category which has the maximum percentage of keywords matching with the relevant words extracted from the data in the signal may be identified as the relevant main technology category for the signal. In an embodiment, a similarity score may be computed between the relevant words extracted from the data in the signal and keywords associated with each main technology category. The main technology category that has the highest similarity score is identified as the relevant main technology category for the signal.

Based on the main technology category identified by the technology identifier 206, the SNR calculator 208 may determine the SNR for the signal. The SNR may be computed as the ratio of the number of words that are relevant to the main technology category to the number of non-relevant words derived from the signal. The non-relevant words may not include any stop word. In order to determine the number of words that are relevant, multiple occurrences of a single relevant word may be taken as is. In other words, if a word occurs five time in the data, the word may be counted five times and not only once. The SNR calculator 208 may determine the words that are relevant by extracting all keywords associated with the main technology category in the technology keywords database 112. Instead of using a simple ratio, any other complex technique may be employed for computing the SNR, in some embodiments.

Based on the SNR, the noise filter 210 may remove the non-relevant words from the data in the signal in order to extract the relevant data. The non-relevant words in this case may include stop words as well. The relevant extracted data may include relevant keywords along with their frequency of occurrence in the signal. The relevant extracted data is then forwarded to the technology tagger 212. In an embodiment, the noise filter 210 may remove noise from the signal, only when the SNR for the signal is above a predefined threshold. Otherwise, the noise filer 210 may be bypassed and the signal along with the source and date tags may be directly forwarded to the technology tagger 212. The technology tagger 212 again compares the keywords in the relevant extracted data with keywords associated with each technology sub-category in the technology keyword database 112. In an embodiment, the technology tagger 212 may start with the technology sub-categories at the lowest hierarchy level in the technology keyword database 112 for comparison and may then move upwards in the hierarchy.

In an embodiment, the technology tagger 212 may compute a similarity score between the relevant extracted data and keywords associated with each technology sub-category in the technology keyword database 112. A technology sub-category that has the highest similarity score may be identified as the relevant technology sub-category for the signal. Alternatively, a predefined threshold score may be used to identify multiple technology sub-technology categories as relevant. In this case, each of the technology sub-category that has a similarity score greater than the predefined threshold score may be identified as relevant. The predefined threshold score may be made more stringent in order to limit the number of identified technology sub-categories to a desired number. Accordingly, the technology tagger 212 assigns a technology tag to the relevant extracted data. Thus, the relevant extracted data representative of the signal is tagged with a source tag, a date tag, and a technology tag. Each of these tags may be appended to the relevant extracted data as metadata.

The technology tagger 212 then forward the relevant extracted data along with the appended tags to the vector processing server 114, which generates a plurality of vectors associated with the plurality of signals. The vector processing server 114 includes a node generator 214, a tag generator 216, and a vector distributor 218. The node generator 214 analyzes the relevant extracted data associated with a signal and generates one or more nodes. Each node represents a measure of innovation activity. The innovation activity, for example, may be the number of patent filings, when the source of the signal is patent office database or website. However, for sources other than patent offices, the innovation activity may not correspond to the number of patent filings and may be measured based on frequency of usage of specific technology related words. Thus, in order to make the measure of innovation activity uniform, the historic patent filing data for a given time period as obtained from one or more patent offices may be mapped to innovation activity as derived from a signal generated by a given source for the same time period. An exhaustive list of such mappings for various technology areas may be stored within an innovation activity database 220. By way of an example, the number of patent filings for a technology category during a given month in the past is determined. Also, for a technology blog related to the technology category, frequency of usage of certain keywords related to the technology category are determined. The average frequency is then mapped to the number of patent filings in that month. This mapping activity may be repeated for various time periods in the past and an average of the resultant mapping may be determined and stored in the innovation activity database 220. Alternatively, for a given technology category, mappings performed at different time periods may be stored separately. A machine learning algorithm may then be trained using data in the innovation activity database 220. Thereafter, the machine learning algorithm may automatically predict and convert innovation activity derived from a signal of a source to a patent filing number. Thus, each node in a vector may represent the number of patent filing for that time period.

The node generator 214 additionally spaces the nodes according to the relevant extracted data. By way of an example, consider that the relevant extracted data indicates innovation activity across a period of three months. The node generator 214 may create three nodes, the first node indicates innovation activity (by way of number of patents filed) in the first month, the second node indicates innovation activity in the second month, and the third node indicates innovation activity in the third month. The spacing between the first node, the second node, and the third node may be set to 1 (corresponding to 1 month). In this example, the output of the node generator 214 is a vector. Based on a user specified criteria, the number of nodes and spacing between the nodes may vary.

Once the vector is generated, the tag generator 216 applies tags to the vector. The tags are identified based on the tags appended to the relevant extracted data, i.e., the source tag, the date tag, and the technology tag. The tag generator 216 then applies the tags to the vector generated by the node generator 214. The source tag may indicate the source of the signal for which the vector is generated, the date tag may indicate the date of publishing of the signal, and the technology tag may indicate the relevant technology associated with the signal.

The vector distributor 218 then forwards the vectors to the vector database 116. In some embodiments, a determination may be made as to whether a vector is public or private. This determination may be based on whether a corresponding signal is public (e.g., has been published online) or private. A public vector may be stored separately from the a private vector in the storage 122 by the storage processing server 124. In some embodiments, the vector distributor 218 makes the determination as to whether a vector is public or private by analyzing the source tag and the date tag. By way of an example, if the value of the date tag is null, the vector may be identified as a private vector. By way of another example, if the source tag is identified as private PAIR, the vector may be identified as private vector. Tags applied to the vector are forwarded along with the vector for storage in their respective databases. The vectors and the tags applied to these vectors are depicted in conjunction with FIG. 3.

Figure 3:
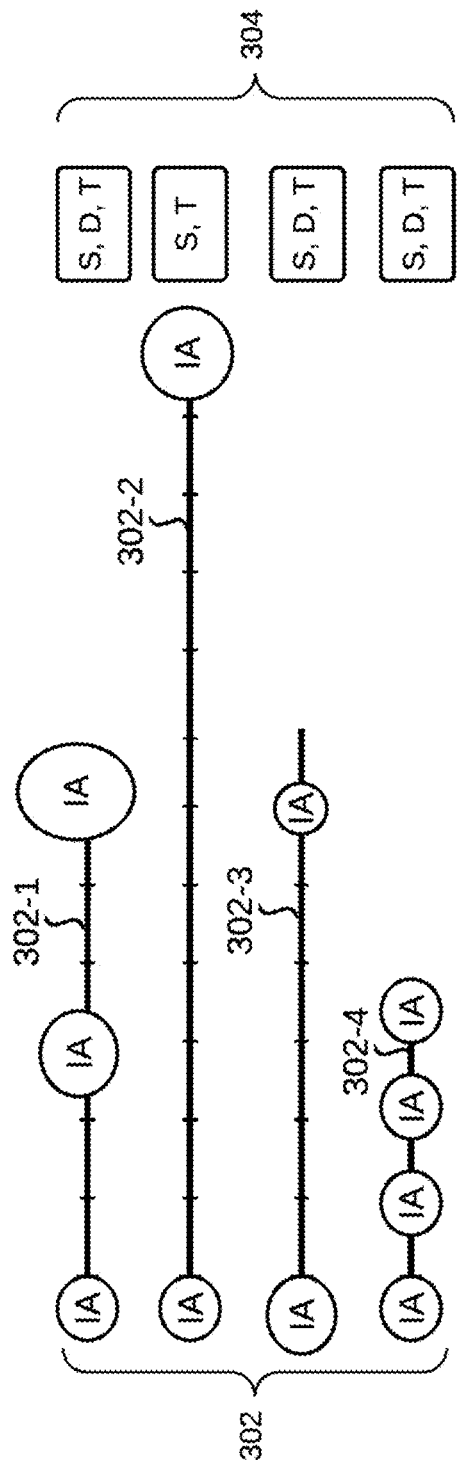
FIG. 3 illustrates vectors and the tags applied to these vectors as stored in a vector database, according to an embodiment of the present disclosure.

FIG. 3 illustrates vectors 302 and tags 304 applied to the vectors 302 as stored in the vector database 116, according to an embodiment of the present disclosure. Vectors 302 are data structures that include one or more nodes with defined spacing between them. Each node (represented as IA) is indicative of innovation activity at a given period of time and size of a node may indicate the amount of innovation activity. The innovation activity may represent the number of patent filings in some embodiments. The spacing between the nodes in each vector represents the time period separating the nodes in months. By way of an example, a vector 302-1 includes three nodes, each of which are separated by a period of 3 months from adjacent nodes, a vector 302-2 includes two nodes, which are separated by a period of 12 months, a vector 302-3 includes two nodes, which are separated by a period of 6 months, and a vector 302-4 includes four nodes, each of which are separated by a period of 1 month adjacent nodes. In the tags 304, 'S' represents the source tag, 'D' represents the date tag, and 'T' represents the technology tag. As is depicted in FIG. 3, the vector 302-2 only has the source tag and the technology tag, since the date information associated with the vector 302-2 could not be identified.

Figure 4:
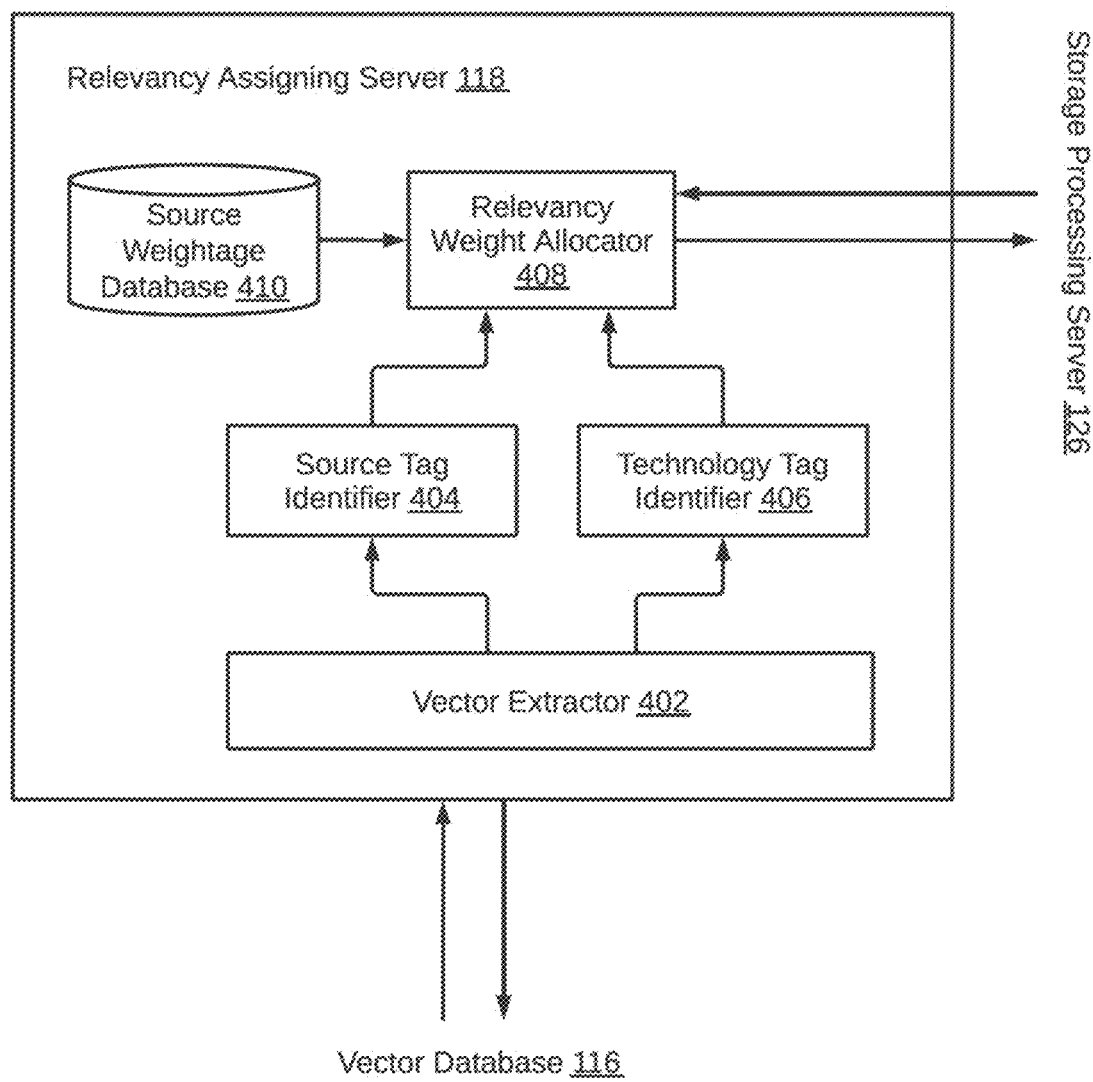
FIG. 4 illustrates a relevancy assigning server, according to an embodiment of the present disclosure.

FIG. 4 illustrates the relevancy assigning server 118, according to an embodiment of the present disclosure. The relevancy assigning server 118 includes a vector extractor 402, a source tag identifier 404, a technology tag identifier 406, a relevancy weight allocator 408, and a source weightage database 410. The vector extractor 402 extract a vector along with the associated tags from the vector database 116. Thereafter, based on the source tag of the vector, the source tag identifier 404 identifies a source of the signal for which the vector is generated. In a similar manner, based on the technology tag of the vector, the technology tag identifier 406 identifies the technology associated with the signal. The technology may be identified as one of the technology sub-categories in the technology keywords database 112. Thereafter, the vector is shared with the relevancy weight allocator 408 along with the source and technology details.

The relevancy weight allocator 408 is communicatively coupled with the source weightage database 410, which includes a mapping of data sources for a given technology to a corresponding relevancy weight. The mapping, for a given technology field, may be created by comparing innovation activity derived from the signal of a given source for a given time period (in the past) with patent filing data obtained from one or more patent offices (for example, the USPTO) for the same time period. Thus, patent filing data as obtained from one or more patent offices may be used as a benchmark to decide relevancy weight to be assigned to a given source. A higher relevancy weight may be assigned to a given source, when the innovation activity derived corresponding to the given source aligns with the patent filing data obtained for the same time period. Similarly, a lower relevancy weight may be assigned to a given source, when the innovation activity derived for the given source deviates from the patent filing data obtained for the same time period. By way of an example, innovation activity derived from a signal obtained from a particular technology blog may rarely align with patent filing data for the same time period for a given technology. Thus, the particular technology blog may be assigned a low relevancy weight for the given technology.

In an alternate embodiment, the relevancy weight may be assigned to a data source based on data authenticity value assigned to that data source. The data authenticity value may be derived based on various factors that may include, but are not limited to number of user views, administrator or owner of the source, number of shares, user comments, access to the source being paid or free, and/or page rank. A source that has higher data authenticity value may be assigned a higher weight, while a source that has lower data authenticity value may be assigned a lower weight.

After a vector has been assigned a relevancy weight, the vector along with the relevancy weight is shared with the storage processing server 124, which further saves the vector and the assigned relevancy weight in the storage 122. When a relevancy weight is assigned to a vector, the measure of innovation activity for each node in the vector is accordingly adjusted. By way of an example, relevancy weights may be assigned from 0.1 to 1. When a relevancy weight of 1 is assigned, it indicates that the measure of innovation activity as depicted by a node of the vector does not need to be adapted. However, when a relevancy weight of 0.1 is assigned, indicates that the measure of innovation activity as depicted by a node of the vector needs to be made $\frac{1}{10}^{th}$ of the initial value.

Figure 5:
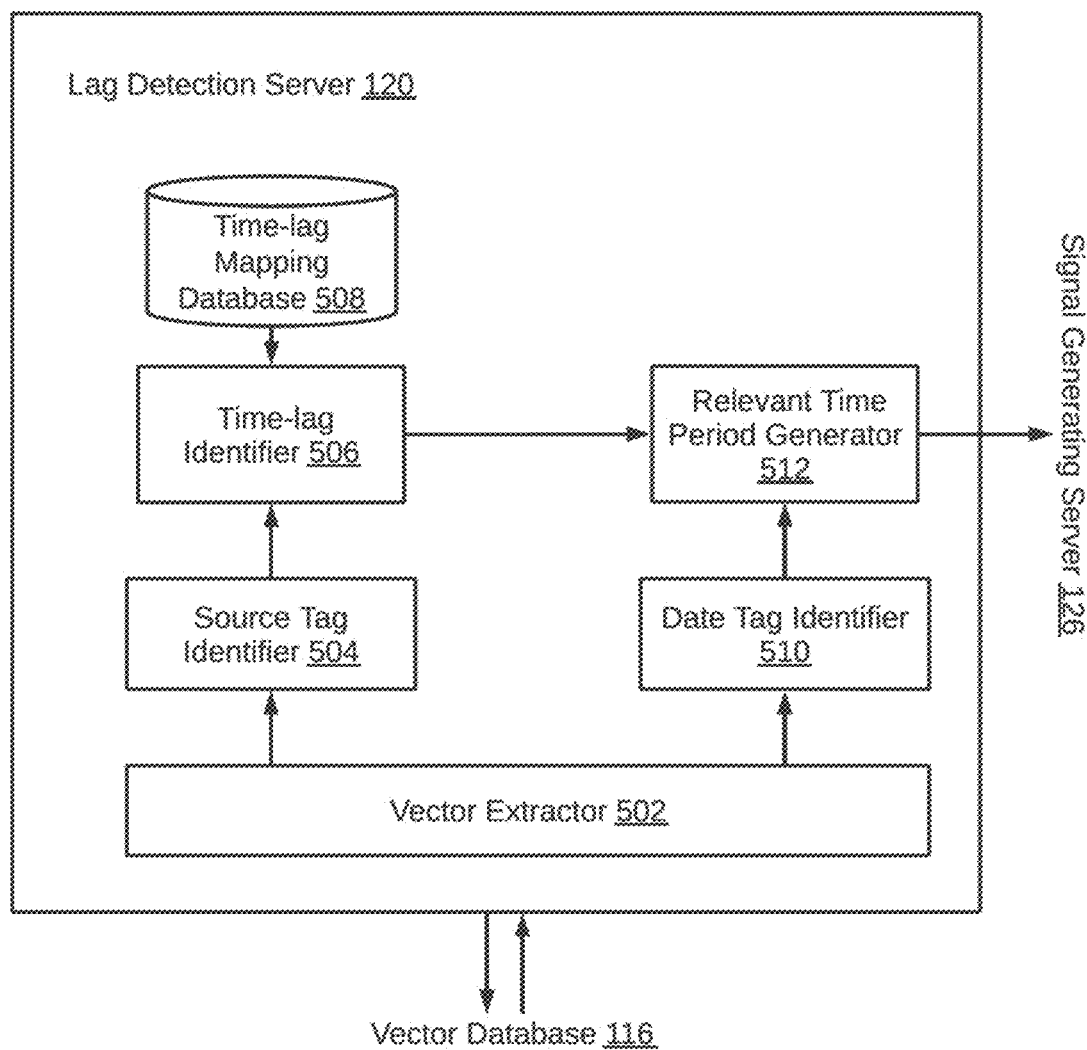
FIG. 5 illustrates a lag detection server, according to an embodiment of the present disclosure.

FIG. 5 illustrates the lag detection server 120, according to an embodiment of the present disclosure. The lag detection server 120 includes a vector extractor 502, a source tag identifier 504, a time-lag identifier 506, a time-lag mapping database 508, a date tag identifier 510, and a relevant time period generator 512. The vector extractor 502 extract a vector along with the associated tags from the vector database 116. Thereafter, based on the source tag of the vector, the source tag identifier 504 identifies a source of the signal for which the vector is generated and shares details of the source with the time-lag identifier 506. The time-lag identifier 506 is communicatively coupled to the time-lag mapping database 508, which includes a mapping of various sources to the associated time-lags. By way of an example, a signal received from the USPTO website may have a time-lag of 1 to 3 months. In other words, the signal received from the USPTO website on a given date is actually reflective of data relevant for a time period that is 1 to 3 months prior to the given date. Thus, a relevant time period needs to be determined for the vector created from the signal. By way of another example, a signal received from a company website announcing a product launch, may have a time-lag of 2 to 3 years (which may vary based on the technology field), as a product launched today may have been in the research and development phase since 2 to 3 years before launch. Thus, based on the source identified by the source tag identifier 504, the time-lag identifier 506 determines a time-lag associated with the vector and shares the same with the relevant time period generator 512.

The date tag identifier 510 identifies the publishing date of the signal for which the vector was created, based on the date tag of the vector. The date tag identifier 510 then shares the publication date with the relevant time period generator 512.

Since the relevant time period generator 512 already has the time-lag associated with the vector, the relevant time period generator 512 adjusts the publication date based on the time-lag to generate a relevant time period for the vector. In continuation of the USPTO example given above, a signal received from the USPTO website may have a time-lag of 1 to 3 months. Thus, the relevant time period may be obtained by regressing the publication date associated with the vector by 2 months (considering an average). Further, in continuation of the website example given above, the relevant time period may be obtained by regressing the publication date of the article by 2.5 years.

Figure 6:
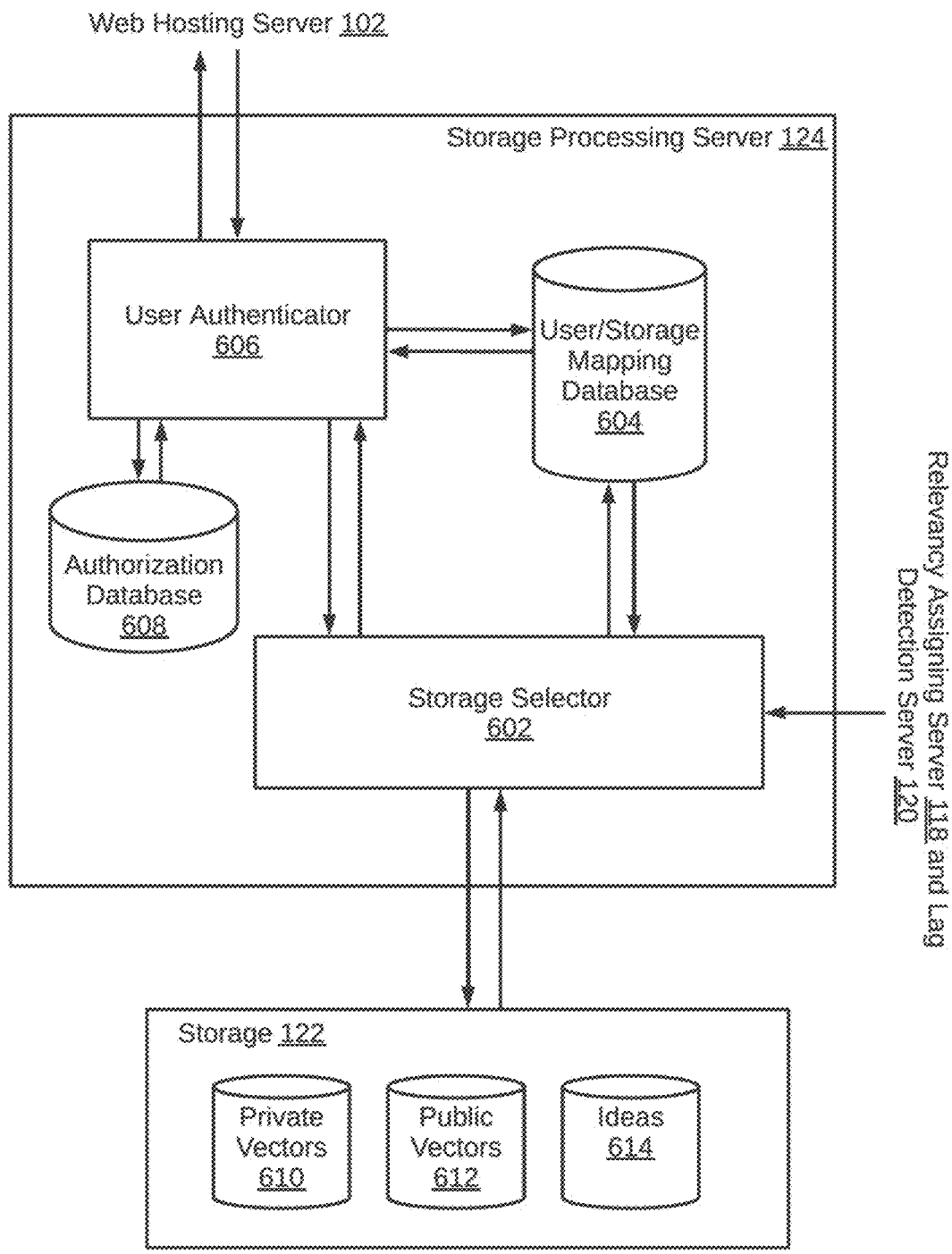
FIG. 6 illustrates a storage processing server and a storage, according to an embodiment of the present disclosure.

FIG. 6 illustrates the storage processing server 124 and the storage 122, according to an embodiment of the present disclosure. To determine the proper storage to route information through, a storage selector 602 accesses a user/storage mapping database 604 which includes a mapping between users and storages. For example, the user/storage mapping database 604 may indicate that a first user has access to the storage 122 only, a second user has access to a different storage (not show in FIG. 6). By way of another example, a private vector may be sent to the storage processing server 124 and the storage selector 602. The storage selector 602 may analyze the administrative data associated with the private vector to determine that the private vector corresponds to the first user. The storage selector 602 may then access the user/storage mapping database 604 to determine which storage the first user may access. After determining that the first user has access to the storage 122, the storage selector 602 may route and store the private vector in the storage 122.

The storage processing server 124 includes a user authenticator 606 for verifying that a storage requestor has the proper authentication to access the specific storage being requested. The user authenticator 606 first determines which user is requesting access. Second, the user authenticator 606 accesses the user/storage mapping database 602 to determine whether the user has access to any of the storages (for example, the storage 122). Third, the requester is routed to the storage selector 602 for identifying and selecting the proper storage. In some embodiments, a storage requestor requests to access a specific storage, for example, the storage 122. In other embodiments, a storage requestor requests to access a non-specific storage, i.e., any available storage. For example, when a storage requestor requests to only store information in any available storage of, the storage selector 602 may identify, select, and route information to any available storage to which the user is authorized to access. The storage 122 may include various user-specific information including, but not limited to: private vectors 610, public vectors 612, and ideas 614 for inventions submitted by an authorized user.

Figure 7:
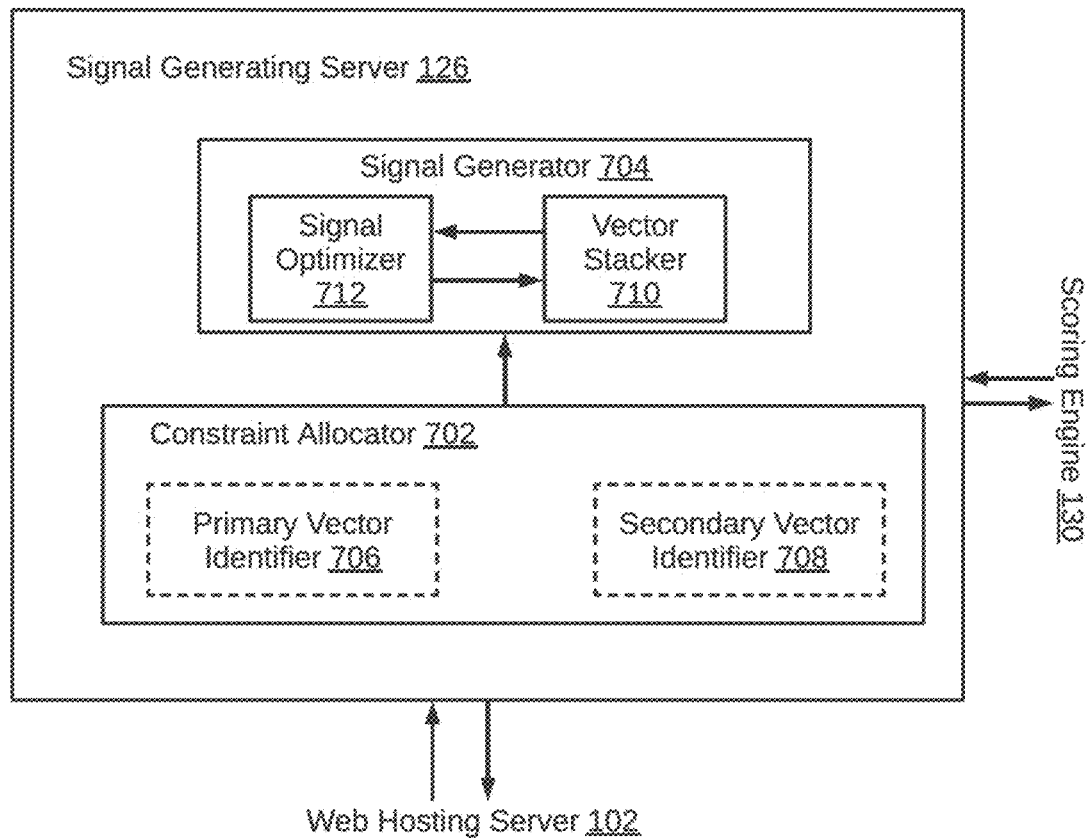
FIG. 7 illustrates a signal generating server configured to generate a time mapped signal, according to an embodiment of the present disclosure.

FIG. 7 illustrates the signal generating server 126 configured to generate a time mapped signal, according to an embodiment of the present disclosure. The signal generating server 126 includes a constraint allocator 702 and a signal generator 704. The constraint allocator 702 may apply constraints as to technology and date to extract a set of vectors stored in the storage 122, via, the storage processing server 124, such that, each vector in the set of vector satisfy the technology and date constraint. By way of an example, the time mapped signal may be required to be generated for Long Term Evolution (LTE) technology for the last three years. In this case, only those vectors that have the technology tag as LTE and have the relevant time period as last three years may extracted from the storage 122. Each vector in the set of vectors is extracted along with the associated relevancy weight, relevant time period, and technology tags.

In some embodiment, the constraint allocator 702 may include a primary vector identifier 706 and a secondary vector identifier 708. The primary vector identifier 706 identifies a primary vector from the set of vectors based on the relevancy weights assigned to each vector. A vector that has the highest relevancy weight may be selected as the primary vector. By way of an example, a vector generated from a signal received from the USPTO website may be assigned the highest relevancy weight (for example, a relevancy weight of one). Thus, in most scenarios, the vector representing USPTO data may be selected as the primary vector. In an embodiment, two or more primary vectors may be selected, such that, relevancy weight for each of the two or more primary vectors is more than a predefined threshold weight. In a similar manner, the secondary vector identifier 708 identifies one or more secondary vectors from the set of vectors based on the relevancy weights assigned to each vector. The secondary vector identifier 708 discards the vector that has the highest relevancy weight and selects the remaining vectors in the set of vectors as the secondary vectors. In an embodiment, when two or more primary vectors may be selected based on the predefined threshold weight, the secondary vector identifier 708 may identify two or more secondary vectors, such that, relevancy weight of each of the two or more secondary vectors is equal to or less than the predefined threshold weight.

Once the constraint allocator 702 extracts the set of vectors, the signal generator 704 generates a time mapped signal for the set of vectors based on the associated relevancy weights and the relevant time periods. A vector stacker 710 within the signal generator 704 may stack each of the set of vectors based on the relevant time period and relevancy weights along a graph. As discussed before, while stacking each vector, the innovation activity (or the number of patent filings) may be adjusted based on the associated relevancy weights. By way of an example, one of the nodes in a vector generated based on a blog signal may indicate that 100 patent applications were filed over a given time period. The vector may have been assigned a relevancy weight of 0.1. Thus, the value at the node may be adjusted to 10 based on the relevancy weight (100×0.1). This may be performed for each vector. In an embodiment, stacking of the set of vectors may be performed by determining a weighted average of nodes that are aligned in the same time period across the set of vectors. The result is a time mapped signal representing the number of patent filings spread across a timeline. This may be represented by way of a line graph with X and Y axis, such that, X axis represents the time, while the Y axis represents the number of patent filings. This is depicted in detail in reference to FIG. 10.

In some embodiment, the signal generator 704 may further include a signal optimizer 712. When a primary vector and two or more secondary vectors are identified separately, the vector stacker 710 may first generate a first time mapped signal based on the primary vector. Thereafter, the vector stacker 710 may stack the two or more secondary vectors to generate a second time mapped signal. In an embodiment, the vector stacker 710 may generate multiple second time mapped signals, such that, each second time mapped signal corresponds to a second vector. In both the scenarios, the signal optimizer 712 may optimize the primary vector based on the second time mapped signal to generate a final time mapped signal. Since each vector is associated with a source, a user may be provided an option, via a GUI, to select those second time mapped signals that are associated with some specific data sources, in order to optimize the first time mapped signal. This is explained in detail in reference to FIG. 11.

Optimizing may include reducing any noise in the first time mapped signal by using one or more second time mapped signals. Alternatively, optimizing may include enhancing the first time mapped signal based on one or more second time mapped signals in order to increase accuracy of the first time mapped signal. By way of an example, the first time mapped signal may misrepresent the patent filing numbers, thus one or more second time mapped signals may be used to correct (by increasing or decreasing) the patent filing numbers.

Figure 8:
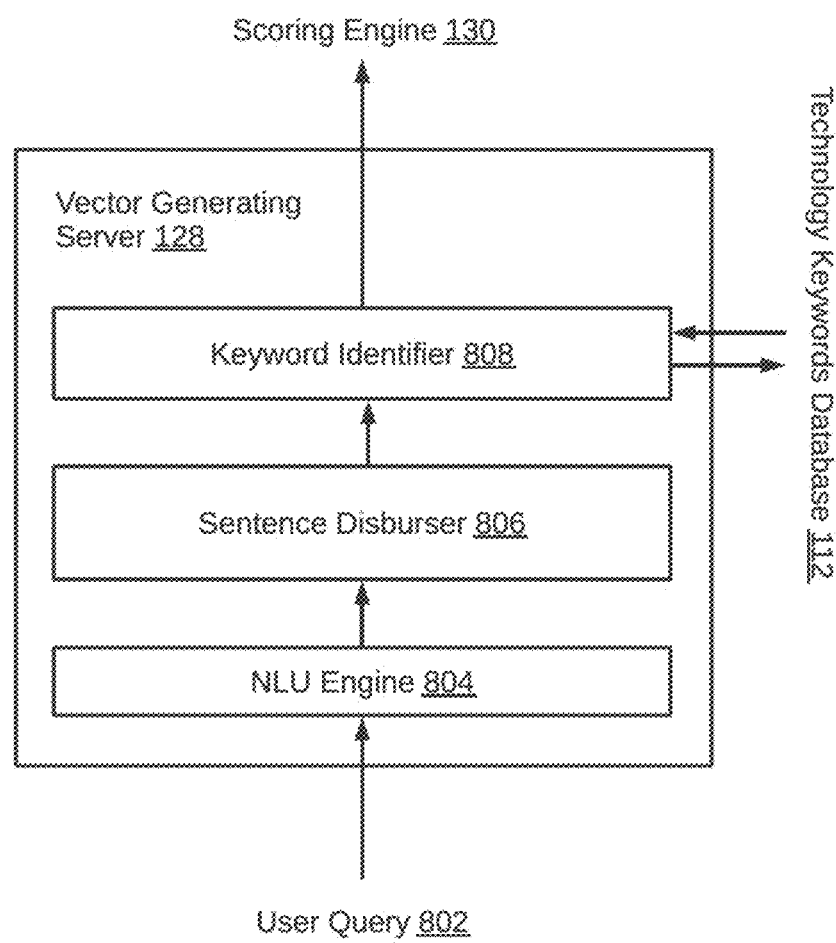
FIG. 8 illustrates a vector generating server, according to an embodiment of the present disclosure.

FIG. 8 illustrates the vector generating server 128, according to an embodiment of the present disclosure. The vector generating sever 128 receives a user query 802, which may be an invention idea. The user query 802 may be provided in natural language, either by way of an audio input, a textual input, or by uploading a document in any format. The user query 802 may be received by an Natural Language Understanding (NLU) engine 804 which deciphers the content, semantic context of each word in the content, and several other granular details from the user query 802. Thereafter, a sentence disburser 806 obtains raw text from the NLU engine 804 as input. The sentence disburser 806 then breaks down the raw text into sentences along with the deciphered content and semantic context of each word in the content. The sentences are then disbursed to a keyword identifier 808, which identifies frequently occurring keywords in the sentences received from the sentence disburser 806, while ignoring stop words. Thereafter, the keyword identifier 808 generates an input vector based on the frequently occurring keywords using vector generating algorithms, which may include, but are not limited to 'word2vec' and 'GloVe'. The input vector is then shared with the scoring engine 130.

Figure 9:
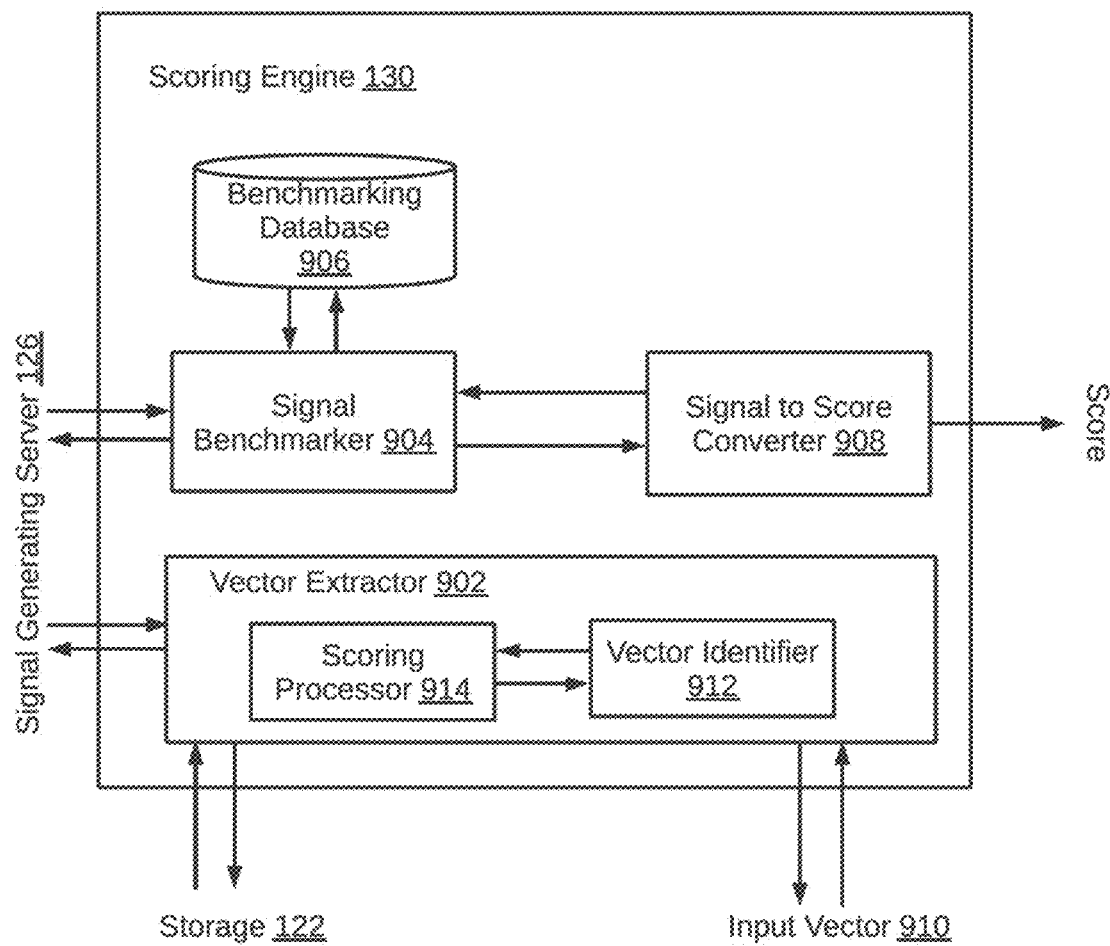
FIG. 9 illustrates a scoring engine, according to an embodiment of the present disclosure.

FIG. 9 illustrates the scoring engine 130, according to an embodiment of the present disclosure. The scoring engine 130 includes a vector extractor 902, a signal benchmarker 904, a benchmarking database 906, and a signal to score converter 908. The vector extractor 902 receives an input vector 910 from the vector generating server 128. A vector identifier 912 within the vector extractor 902 compares the input vector 902 with the plurality of vectors stored in the storage 122. The vector identifier 912 may access the storage 122, via the storage processing server 124 and extract a set of vectors that match with the input vector 910.

A scoring processor 914 within the vector extractor 902 then computes a similarity score for each vector in the set with respect to the input vector 910. Based on the computed similarity scores, a subset of vectors is selected from within the set of vectors, such that, the similarity scores for each vector in the subset is greater than a predefined threshold score. The predefined threshold score may be modified based on the accuracy requirement of an end user. Additionally, if the number of vectors that satisfy the predefined threshold score is considerably less, then the predefined threshold score may be decreased.

The scoring processor 914 then shares the subset of vectors along with the assigned tags (as retrieved from the storage 122) with the signal generating server 126. The technology tag for each of the subset of vectors would be the same. The signal generating server 126 generates a time mapped signal for the subset of vectors using the process that has already been explained in detail in reference with FIG. 7. The time mapped signal is then received by the signal benchmarker 904 that is communicatively coupled to the benchmarking database 906.

The benchmarking database 906 includes a mapping of each technology sub-category to a benchmark signal. The benchmark signal for a given technology sub-category represents an average number of patent applications that had been filed for a given technology sub-category over a timer period that precedes the time of generation of the input vector 910. The benchmarking database 906 may be automatically updated in a periodic manner in order to keep the benchmark signal for each technology sub-category updated. By way of an example, if the input vector 910 is generated on a given day for a particular technology sub-category, the benchmark signal for that technology sub-category may be generated based on signals that were retrieved over a span of one year and additionally precede the given day by an year.

Once the signal benchmarker 904 has retrieved the benchmark signal based on the received time mapped signal, the signal benchmarker 904 shares these signals with the signal to score converter 908. Based on the magnitude of difference between the benchmark signal and the time mapped signal, the signal to score converter 908 may generate a score for the input vector 910. The magnitude of difference may indicate an increase or decrease in the number of patent filing when compared to the period for which the benchmark signal was generated. In an embodiment, in order to generate the score, the signal to score converter 908 may compare the magnitude of difference with a plurality of threshold ranges. The score is assigned based on the threshold range within which the magnitude of difference lies. The plurality of threshold ranges may be defined by an administrator.

The score (or the heat score) is thus generated for the invention idea submitted by the user. The score may be represented on the GUI in the form of flames, such that, more number of flames indicate that the invention idea is in a hot technology field and that the user should promptly file a patent application to protect the invention idea.

Figure 10:
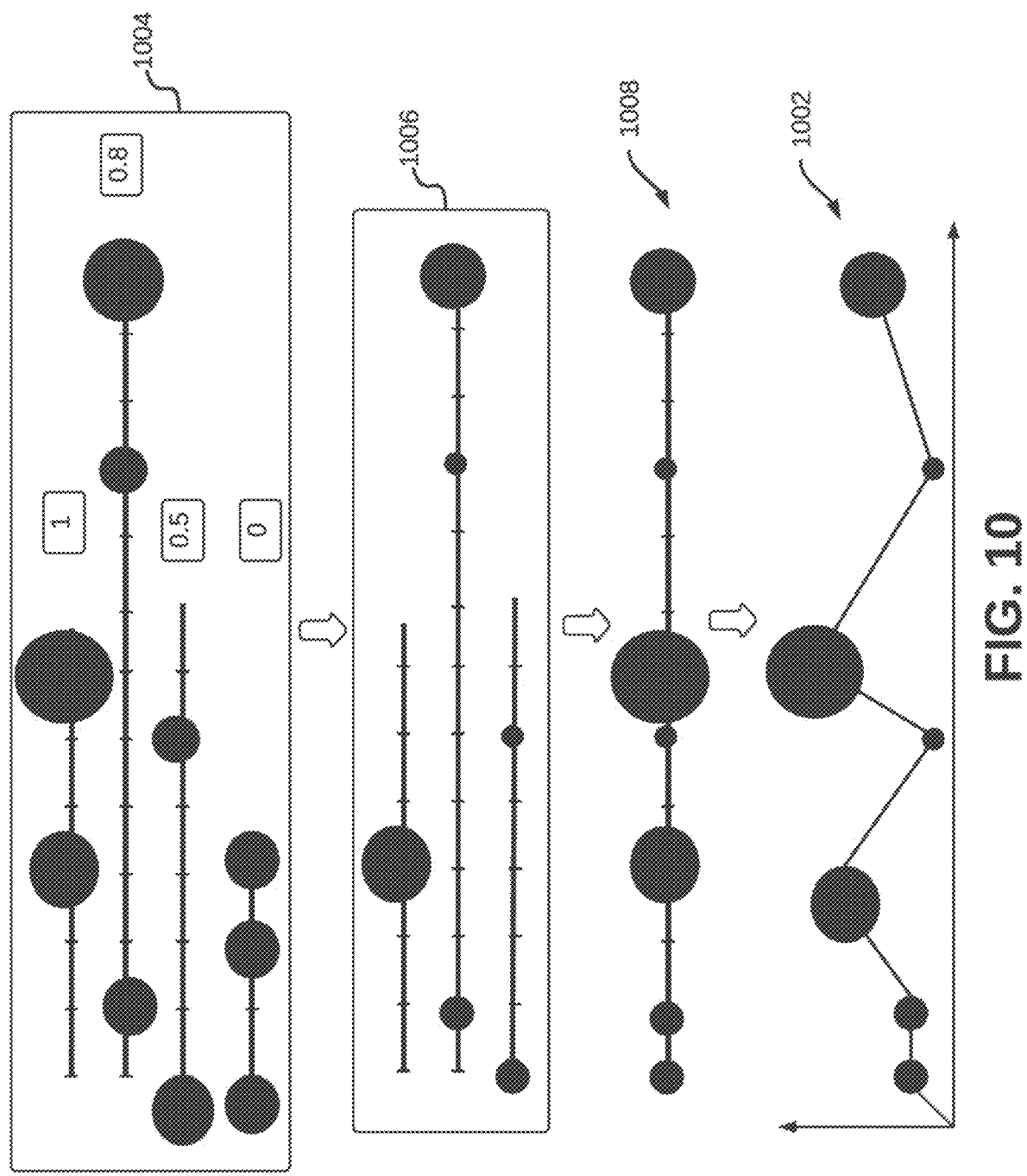
FIG. 10 illustrates generation of a time mapped signal from vectors generated by a vector generating server, according to an embodiment of the present disclosure.

FIG. 10 illustrates generation of a time mapped signal 1002 from vectors 1004 generated by the vector generating server 128, according to an embodiment of the present disclosure. The vectors 1004 include four vectors that are derived from signals received from four different data sources. Each of the vectors 1004 is also assigned a relevancy weight by the relevancy assigning server 118, based on the associated data sources. The first vector is assigned a weight of 1, the second vectors is assigned a weight of 0.8, the third vector is assigned a weight of 0.5, while the fourth vector is assigned 0 weight. The node size for each vector is indicative of a magnitude of patent filings during a particular time period.

In order to generate the time mapped signal 1002, the vector stacker 710 adjusts each of the vectors 1004 based on associated relevancy weights to generate weight adjusted vectors 1006. As is depicted, the fourth vector is removed in the weight adjusted vectors 1006, as the assigned relevancy weight for the fourth vector was zero. Also, the node size for each of the second and third vectors is decreased owing to the associated relevancy weights being less than one. The node size for the first vector is however retained as the associated relevancy weight is one.

The vector stacker 710 then stacks the weight adjusted vectors 1006 to generate a combined vector 1008, which is then mapped with time to generate the time mapped signal 1002. The time mapped signal 1002 represents patent filing trends spread across a time period for a given technology.

Figure 11:
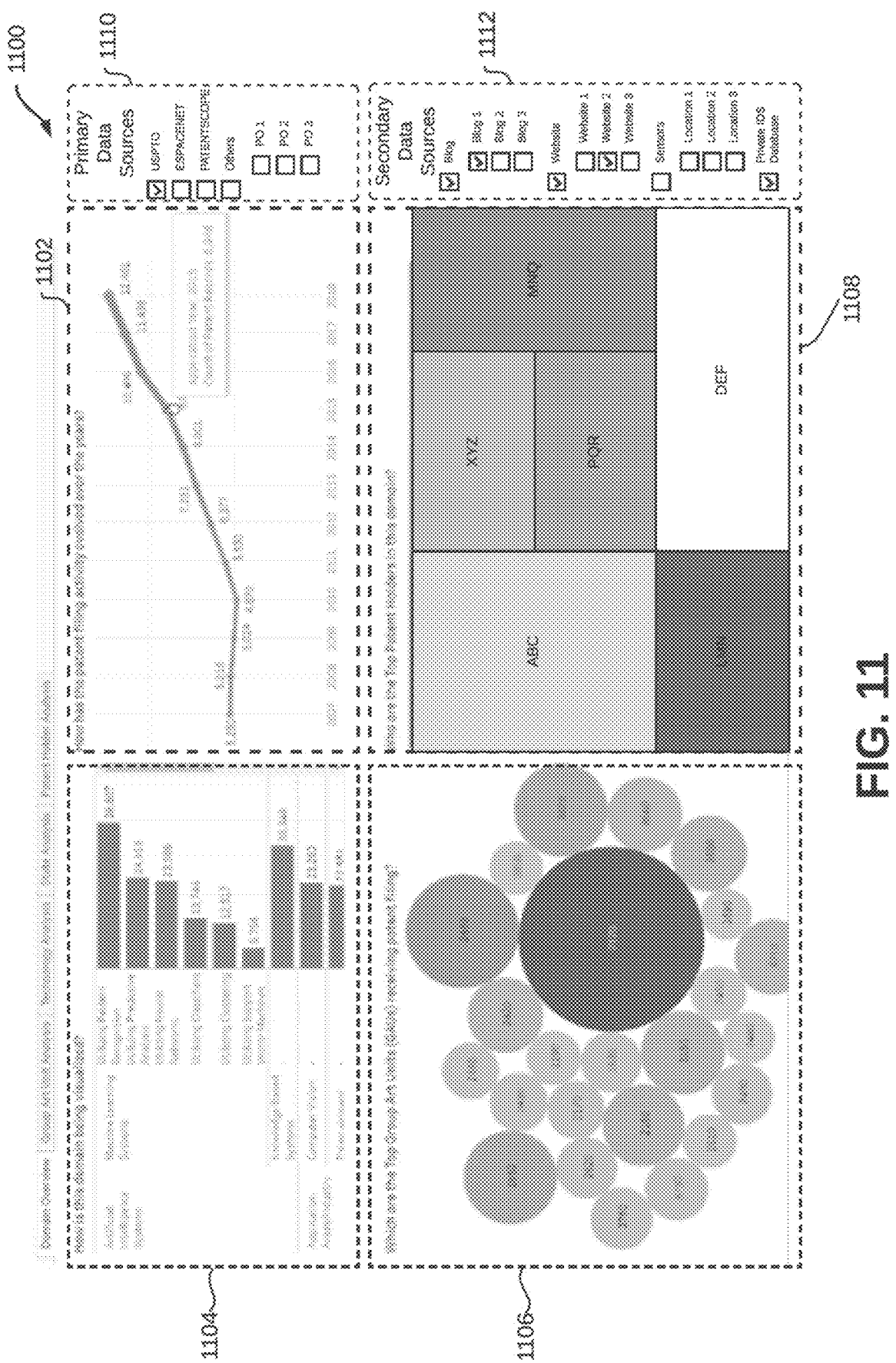
FIG. 11 illustrates a Graphical User Interface (GUI) associated with a patent management system, according to an embodiment of the present disclosure.

FIG. 11 illustrates a GUI 1100 associated with the patent management system 100, according to an embodiment of the present disclosure. The GUI 1100 is generated by the web hosting server 102 and is accessible by the user device 104 via the Internet. The GUI 1100 may either be accessed via a web browser in the user device 104 and/or through an application (associated with the patent management system 100) installed on the user device 104. Once the GUI 1100 is operative on the user device 104, the GUI 1100 provides a section 1102 that depicts a time mapped signal as generated by the signal generating server 126. The time mapped signal depicts the patent filing trend or activity for a particular technology over the years. The GUI 1100 further includes a section 1104 that depicts patent filing distribution across various technology sub-categories, a section 1106 that depicts patent filing distribution across various AUs, and a section 1108 that depicts patent filing distribution across various assignees.

In some embodiments, the GUI 1100 may include a primary data sources section 1110 and a secondary data sources section 1112. The primary data sources sections 1110 may include multiple check-boxes, such that, a user may select one or more data sources that may be used to generate a primary time mapped signal. The data sources in the primary data sources section 1110 may correspond to multiple patent offices around the world. In the GUI 1100, the user has only selected USPTO as the data source to be used to generate a primary time mapped signal. In default setting, USPTO may be selected as the primary data source, which may be changed by the user. In a similar manner, the secondary data sources section 1112 also includes multiple check boxes, such that, the user may select one or more data sources to generate a secondary time mapped signal. In default setting, all available secondary data sources may be selected. The primary and secondary time mapped signal are then combined (as explained in FIG. 7) to generate the time mapped signal in section 1102. Thus, the user may be provided complete control over the type of data sources that he/she wants to select for generation of the time mapped signal. Moreover, the user may play around with selection of different data sources to see how the time mapped signal varies in response to such selections.

FIG. 12 illustrates a GUI 1200 associated with the patent management system 100, according to another embodiment of the present disclosure. The GUI 1200 may be associated with an invention disclosure form that may be used to submit an invention idea. Various elements and sections depicted in the GUI 1200 are merely exemplary and are illustrated for the ease of depiction. The GUI 1200 may include additional elements and sections that are not shown in the FIG. 12. Moreover, multiple variations and combinations of the elements and sections are within the scope of the present disclosure. The GUI 1200 is generated by the web hosting server 102 and is accessible by the user device 104 via the Internet. The GUI 1200 may either be accessed via a web browser in the user device 104 and/or through an application (associated with the patent management system 100) installed on the user device 104. Once the GUI 1200 is operative on the user device 104, the GUI 1200 provides a section 1202 that may be used to provide docket number and title of an invention idea, a section 1204 that may be used to submit details related to inventors (for example, name of the inventors, email address, residential address, and/or other contact details) and details related to the assignee (for example, name of the assignee, email address, registered address, and/or other contact details).

The GUI 1200 may provide a section 1206 that may be used to enter law firm details (for example, name of the law firm, email address, and other contact details) and attorney details (for example, name of the attorney, specialization, email address, and other contact details). A section 1208 and/or a section 1210 may be used by a user to provide details related to the invention idea. The section 1208 may be used to upload an audio file that includes an inventor's voice recording disclosing the invention idea. The voice recording may be created by an attorney, while having an invention discussion with the inventor. The section 1208 may also be used to upload a text file that includes details of the invention idea. The text file may be an MS Word file, a PDF file, or any other file format that is capable of retaining and rendering text. Once the user uploads an audio file and/or a text file, the user may activate a submit button in order to submit the invention idea. Contemporaneous to the user activating the submit button, a section 1212 may generate a heat score for the invention idea. The heat score may provide an indication to the user regarding current innovation activity in the associated technology area. The heat score may enable a user to decide whether the user should file a patent application for the invention idea or should not pursue the invention idea further. As depicted, the heat score may be represented by the number of flames.

In a similar manner, the section 1210 may be used to write text for the invention idea in the provided text box. The section 1210 may be used when a user may not already have a text of the invention idea available with him/her. Once the user has provided the text, the user may activate the submit button. Contemporaneous to the user activating the submit button, a section 1212 may generate a heat score for the invention idea. In some embodiments, the GUI 1200 may provide a section 1214 that may be used to provide a suggested "File By" date and a predicted AU for the invention idea. The "File By" date and the predicted AU may be provided contemporaneous to the user activating the submit button in the section 1208 and/or the section 1210. The "File By" date may provide an idea to the user that, a patent application protecting the invention idea should be filed by a given date. The "File By" date may be determined based on a time mapped signal generated based on the invention idea. In an embodiment, a slope of the time mapped signal may be used to determine the "File By" date. By way of an example, if the slope of the time mapped signal is greater than or equal to 45 degree, the "File By" date may be three month from the day of submitting the invention idea via the GUI 1200. Similarly, if the slope of the time mapped signal is less than 45 degree, but greater than 20 degree, the "File By" date may be nine months from the day of submitting the invention idea via the GUI 1200. The time period for computing the "File By" date may be determined based on historic data. A negative slope may indicate that the innovation activity (the number of patent filing) in the technology area of the invention idea is on a decline. Thus, in this case, the "File By" date may be provided as NULL, which may indicate that the user should not go ahead with filing the patent application.

Figure 13:
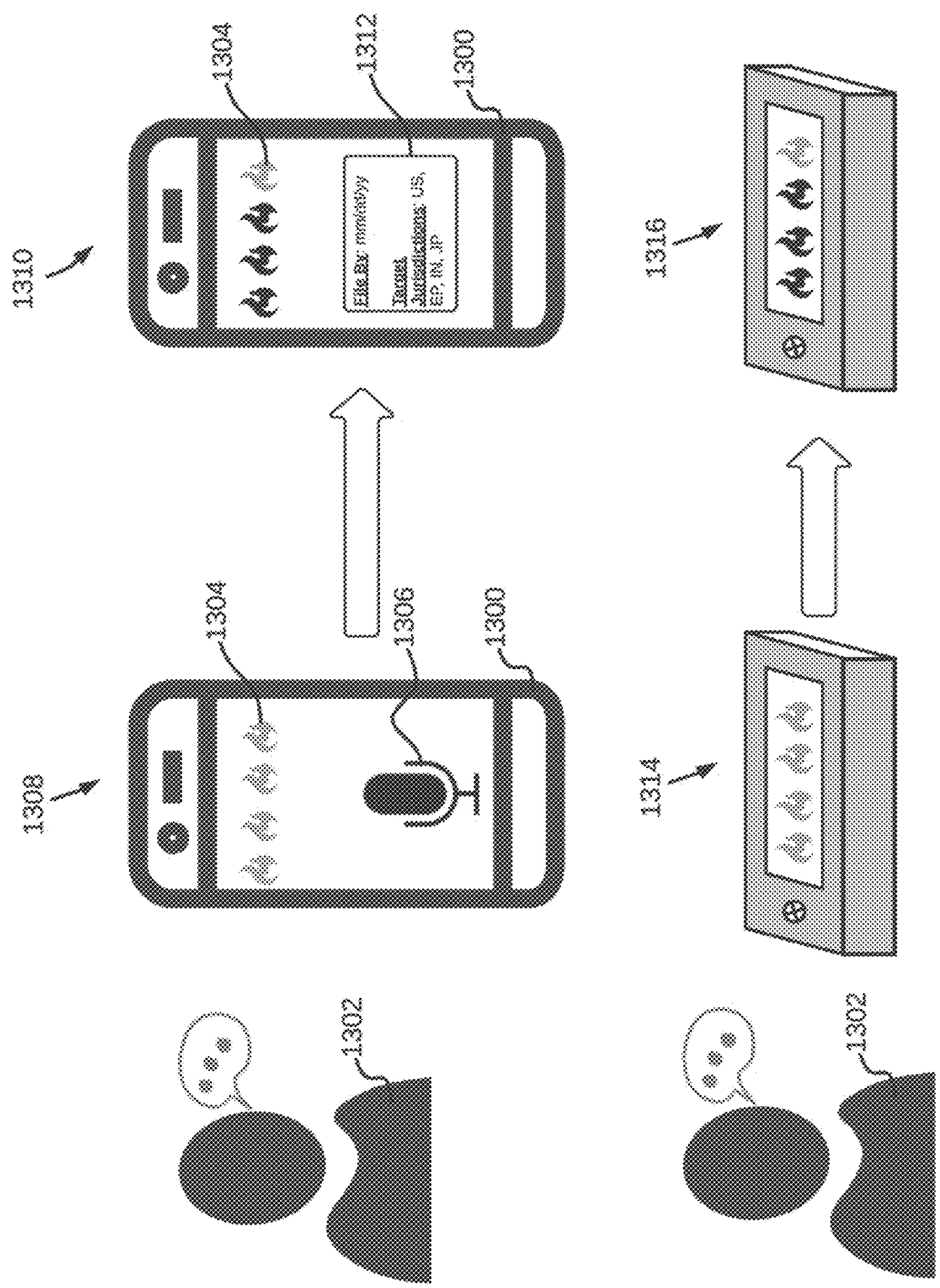
FIG. 13 illustrates a use case scenario where a mobile device is coupled to a patent management system through a web hosting server, according to an embodiment of the present disclosure.

FIG. 13 illustrates a use case scenario where a mobile device 1300 is coupled to the patent management system 100 through the web hosting server 102, according to an embodiment of the present disclosure. Examples of the mobile device 1300 may include, but are not limited to a smart phone, a tablet, or a phablet. In an embodiment, the mobile device 1300 may be any device that has wireless communication capability, a display screen, and a mic.

A user 1302 may access the patent management system 100 on the mobile device 1300, by way of an application installed on the mobile device 1300. When the user 1302 accesses the application on the mobile device 1300, the application may establish communication with the patent management system 100. The application may render an interface customized for the mobile device 1300. The interface may be simple, such that, the interface only include a heat score field 1304 and a mic button 1306. A state 1308 of the mobile device 1300 depicts the interface, when the user 1302 has not provided any input.

The user 1302 may activate the mic button 1306 to start recording the invention idea dictated by the user 1302. Once the user 1302 has finished dictating the invention idea, the user 1302 may deactivate the mic button 1306. Contemporaneous to the user 1302 deactivating the mic button 1306, a heat score may be determined. The user 1302 may also submit the invention idea through a text box (not shown in FIG. 13), by typing the invention idea on the mobile device 1300. In an embodiment, a patent filing suggestion may also be determined along with the heat score. The patent filing suggestion may include a "File By" date and target jurisdictions. A state 1310 of the mobile device 1302 depicts the heat score (three flames are activated) and the patent filing suggestion in a field 1312.

In an embodiment, a display of the mobile device 1300 may just be configured to display the heat score by way of flames and to record voice of the user 1302. Thus, in this case, the mobile device 1300 may only be configured to display heat scores and may not be used for any other purpose. Such a mobile device is depicted by 1314 (before a heat score is generated) and 1316 (after the heat score is generated, based on the input provided by the user 1302).

Figure 14A:
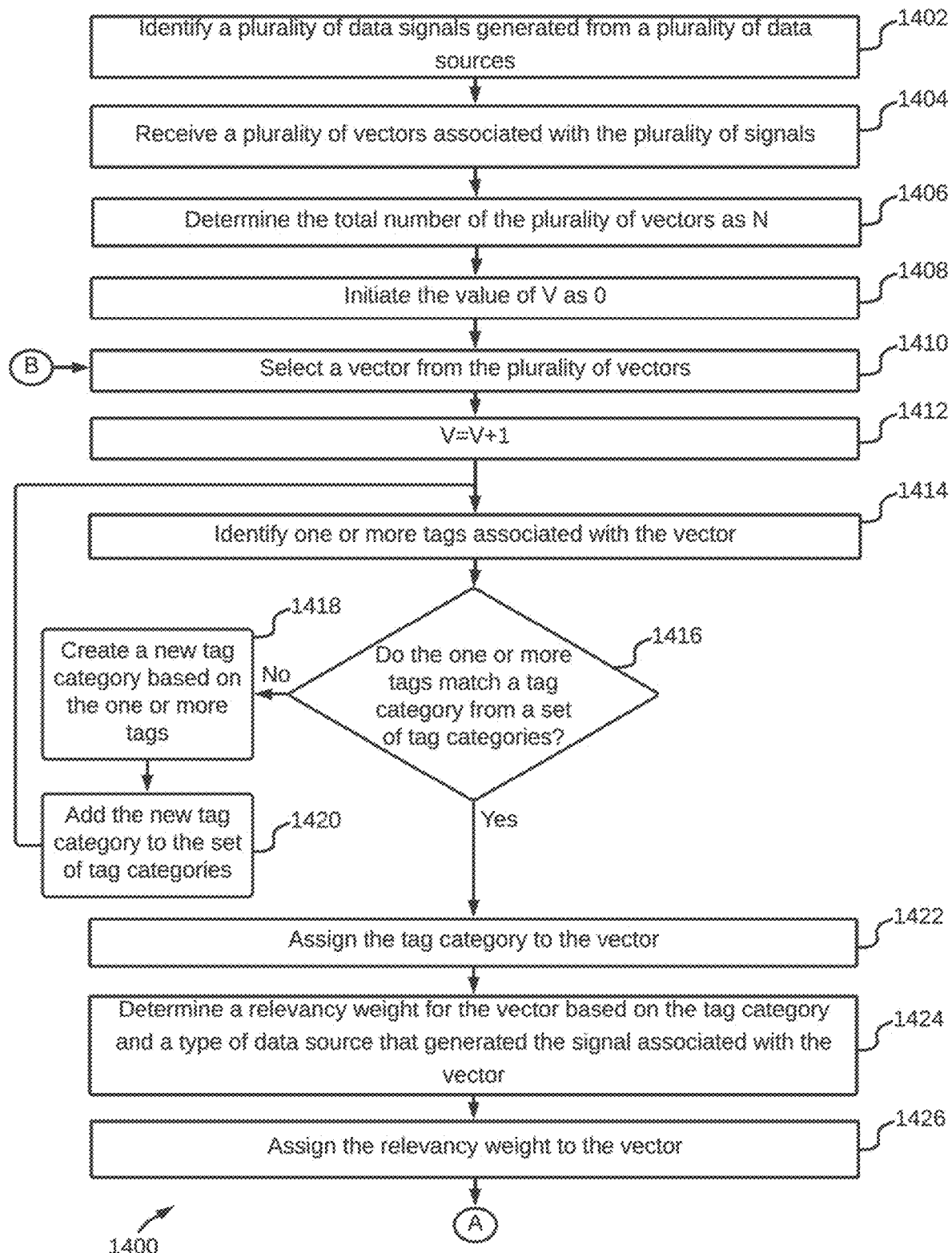
FIGS. 14A and 14B illustrate a method for generating a signal based on multiple signals, according to an embodiment of the present disclosure.
Figure 14B:
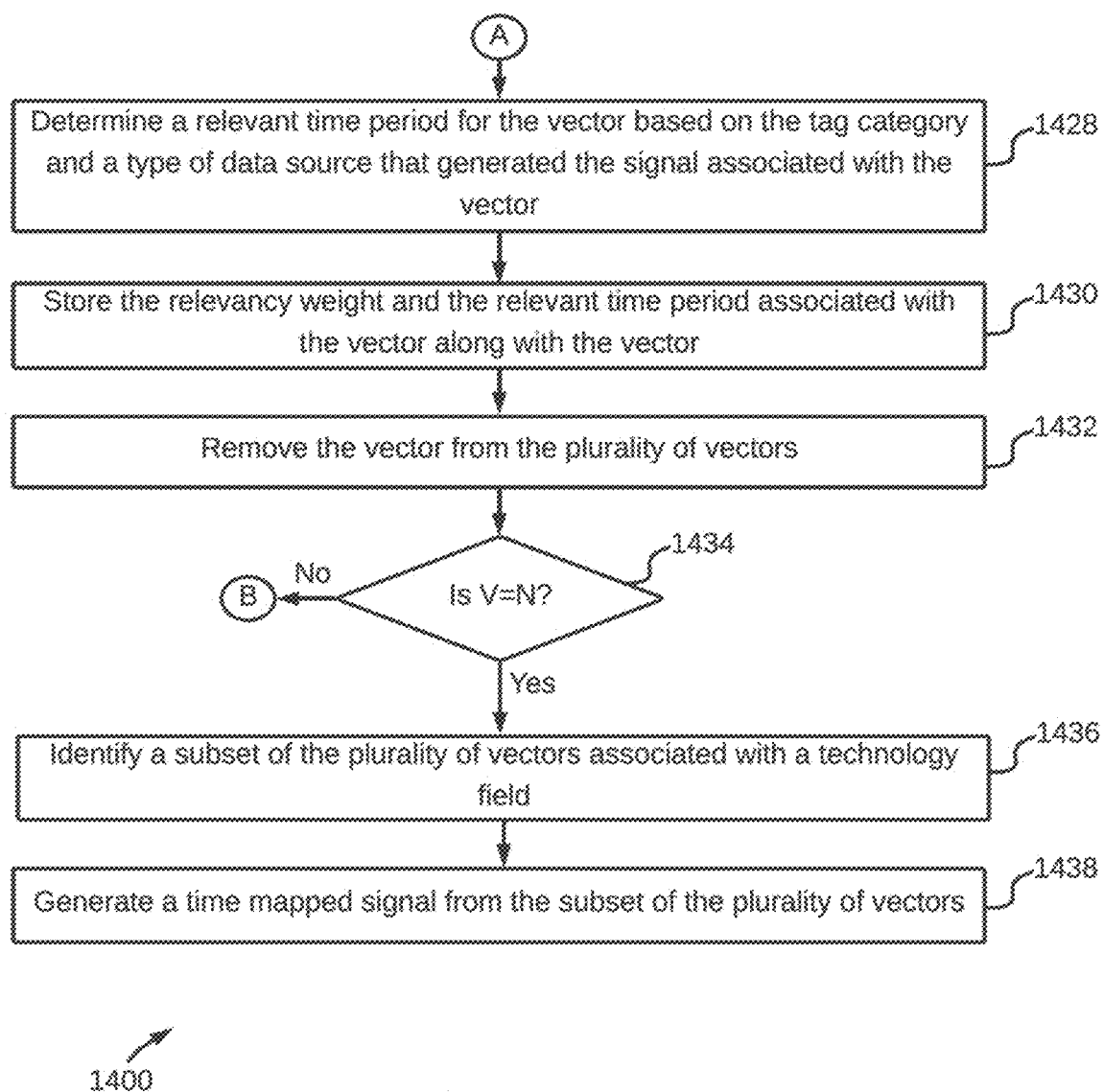

FIGS. 14A and 14B illustrate a method 1400 for generating a signal based on multiple signals, according to an embodiment of the present disclosure. At step 1402, a plurality of signals are identified from a plurality of data sources (for example, the data sources 108). At step 1404, a plurality of vectors associated with the plurality of signals are received. At step 1406, the total number of vectors in the plurality of vectors is determined as N. At step 1408, value of a variable V is initiated at zero. At step 1410, a vector is selected from the plurality of vectors. At step 1412, the value of variable V is defined as "V=V+1." At step 1414, one or more tags associated with the vector selected at step 1410 are identified. There may be a plurality of tags, such that, each of the plurality of tags is associated with one or more technology fields. In an embodiment, in addition to technology tags, source and date tags may also be identified. This has been explained in detail in reference to FIG. 1 and FIG. 2.

At step 1416, a check is performed to determine whether the one or more tags match a tag category from a set of tag categories. A tag category may correspond to technology category or sub-category, for example, as defined in the technology keywords database 112. If the one or more tags do not match a tag category, a new tag category may be created based on the one or more tags at step 1418. At step 1420, the new tag category may be added to the set of tag categories. The new tag category may be created in the technology keywords database 112. Thereafter, the control of the method 1400 moves to step 1414.

Referring back to step 1416, if the one or more tags match a tag category, the tag category is assigned to the vector at step 1422. At step 1424, a relevancy weight is determined for the vector based on the tag category and a type of data source that generated the signal associated with the vector.

At step 1426, the relevancy weight is assigned to the vector. This has been explained with reference to FIG. 4. At step 1428, a relevant time period for the vector is determined based on the tag category and a type of data source that generated the signal associated with the vector. This has been explained with reference to FIG. 5. At step 1430, the relevancy weight and the relevant time period associated with the vector are stored along with the vector. These may be stored, for example, in the storage 122.

At step 1432, the vector is removed from the list of the plurality of vectors. At step 1434, a check is performed to determine whether the current value of the variable 'V' is equal to the value of 'N' or not. If the current value of the variable 'V' is not equal to the value of 'N,' the control of the method 1400 moves to the step 1410. However, if the current value of the variable 'V' is equal to the value of 'N,' at step 1436, a subset of the plurality of vectors is identified, such that, vectors in the subset are associated with a technology field. The technology field may be determined based on an input provided by a user. This has been explained with reference to FIG. 7 and FIG. 8. At step 1438, a time mapped signal is generated from the subset. This has been explained with reference to FIG. 7 and FIG. 9.

Figure 15A:
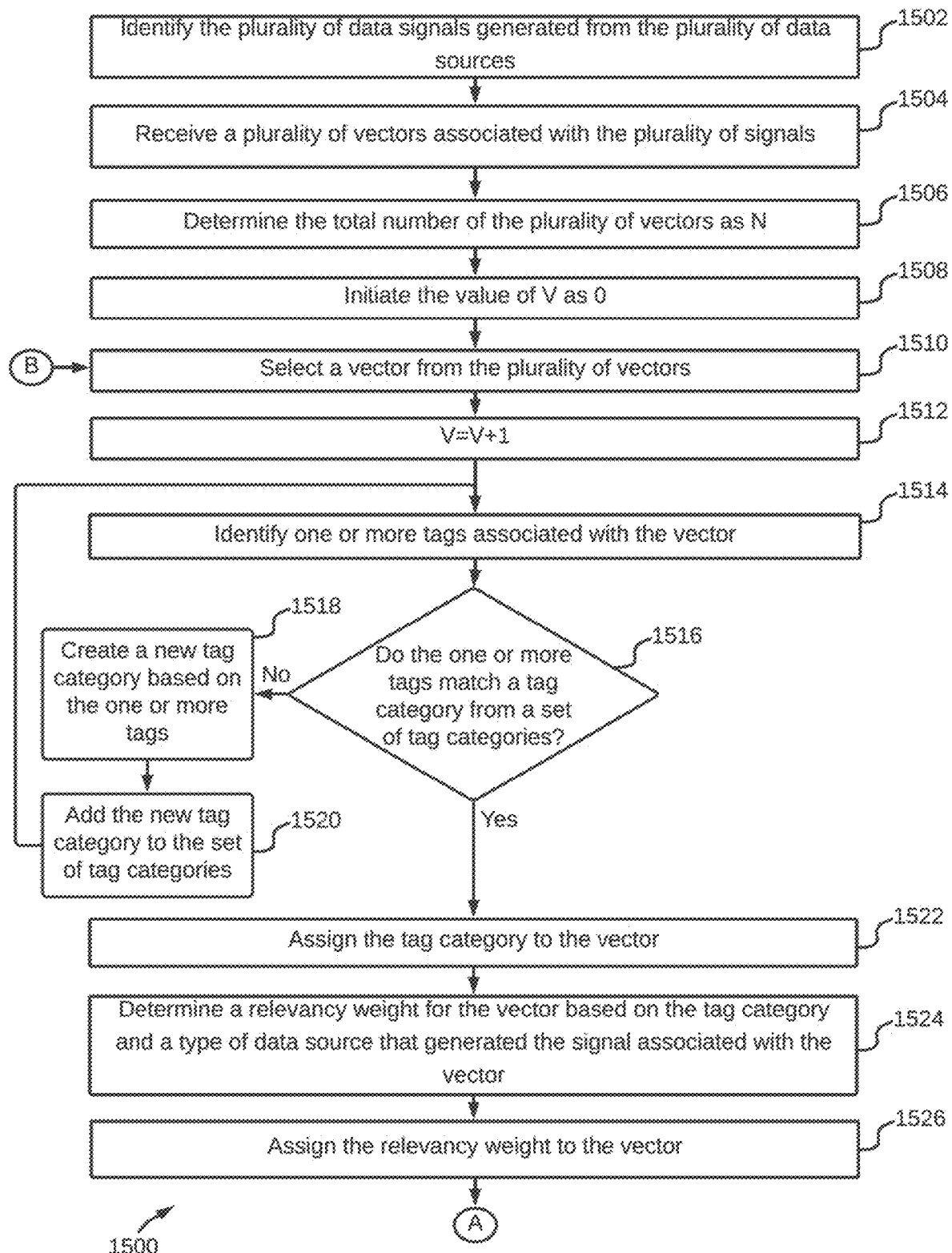
FIGS. 15A and 15B illustrate a method for generating a signal based on multiple signals, according to another embodiment of the present disclosure.
Figure 15B:
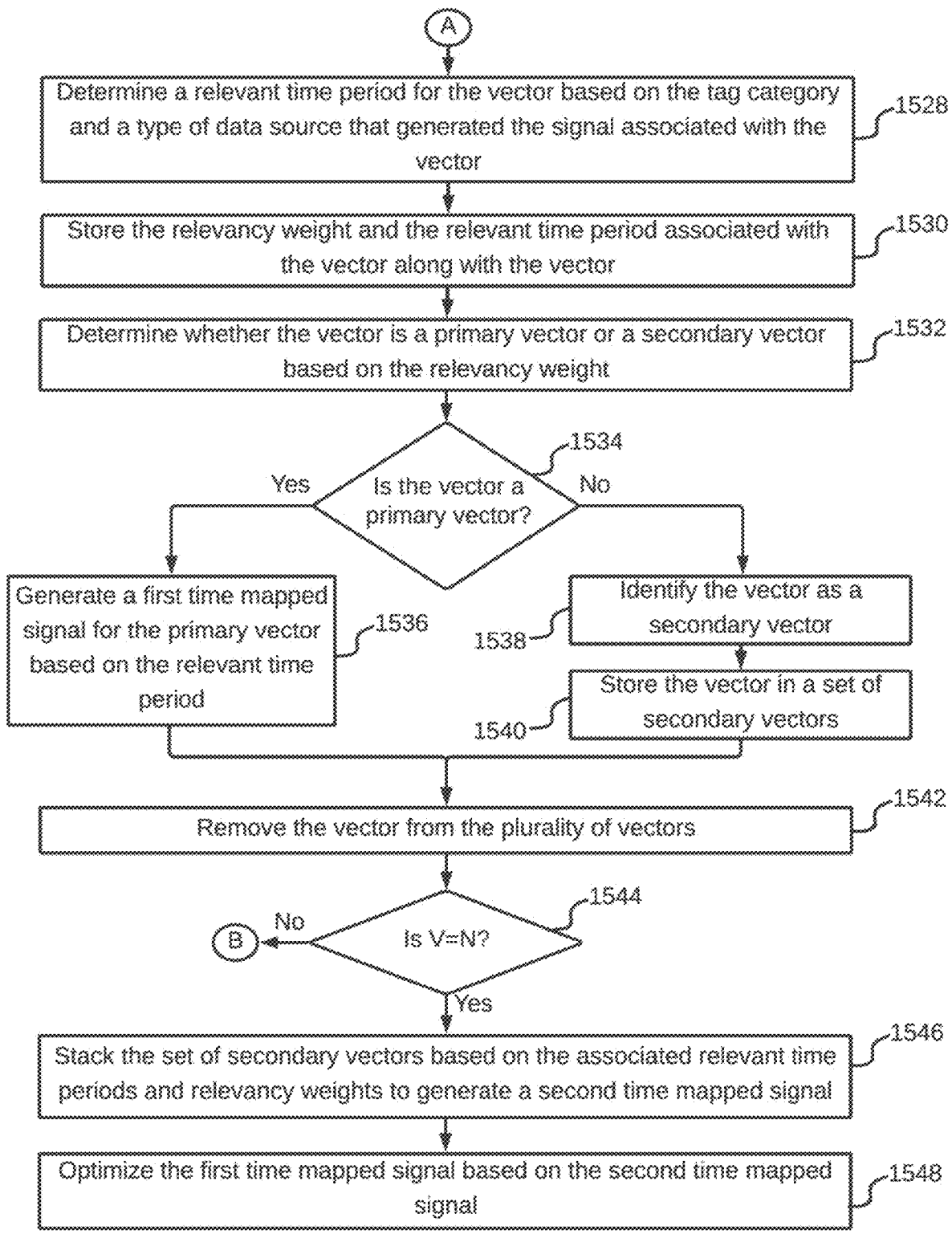

FIGS. 15A and 15B illustrate a method 1500 for generating a signal based on multiple data signals, according to another embodiment of the present disclosure. At step 1502, a plurality of signals are identified from a plurality of data sources (for example, the data sources 108). At step 1504, a plurality of vectors associated with the plurality of signals are received. At step 1506, the total number of vectors in the plurality of vectors is determined as N. At step 1508, value of a variable V is initiated at zero. At step 1510, a vector is selected from the plurality of vectors. At step 1512, the value of variable V is defined as "V=V+1." At step 1514, one or more tags associated with the vector selected at step 1510 are identified. There may be a plurality of tags, such that, each of the plurality of tags is associated with one or more technology fields. In an embodiment, in addition to technology tags, source and date tags may also be identified. This has been explained in detail with reference to FIG. 1 and FIG. 2.

At step 1516, a check is performed to determine whether the one or more tags match a tag category from a set of tag categories. A tag category may correspond to technology category or sub-category, for example, as defined in the technology keywords database 112. If the one or more tags do not match a tag category, a new tag category may be created based on the one or more tags at step 1518. At step 1520, the new tag category may be added to the set of tag categories. The new tag category may be created in the technology keywords database 112. Thereafter, the control of the method 1500 moves to step 1514.

Referring back to step 1516, if the one or more tags match a tag category, the tag category is assigned to the vector at step 1522. At step 1524, a relevancy weight is determined for the vector based on the tag category and a type of data source that generated the signal associated with the vector. At step 1526, the relevancy weight is assigned to the vector. This has been explained with reference to FIG. 4. At step 1528, a relevant time period for the vector is determined based on the tag category and a type of data source that generated the signal associated with the vector. This has been explained with reference to FIG. 5. At step 1530, the relevancy weight and the relevant time period associated with the vector are stored along with the vector. These may be stored, for example, in the storage 122.

At step 1532, it is determined whether the vector is a primary vector or a secondary vector, based on the relevancy weight assigned to the vector. At step 1534, a check is performed to determine whether the vector is a primary vector or not. If the vector is the primary vector, at step 1534, a first time mapped signal is generated for the primary vector based on the relevant time period. However, if the vector is not determined as the primary vector, at step 1538, the vector is identified as a secondary vector. At step 1540, the vector is stored in a set of secondary vectors.

Once either of the step 1536 and/or the step 1540 are executed, at step 1542, the vector is removed from the plurality of vectors. At step 1544, a check is performed to determine whether the current value of the variable 'V' is equal to the value of 'N' or not. If the current value of the variable 'V' is not equal to the value of 'N,' the control of the method 1500 moves to the step 1510. However, if the current value of the variable 'V' is equal to the value of 'N,' at step 1546, the set of secondary vectors are stacked based on the associated relevant time periods and relevancy weights to generate a second time mapped signal. At step 1548, the first time mapped signal is optimized based on the second time mapped signal. This has been explained with reference to FIG. 7 and FIG. 9.

Figure 16:
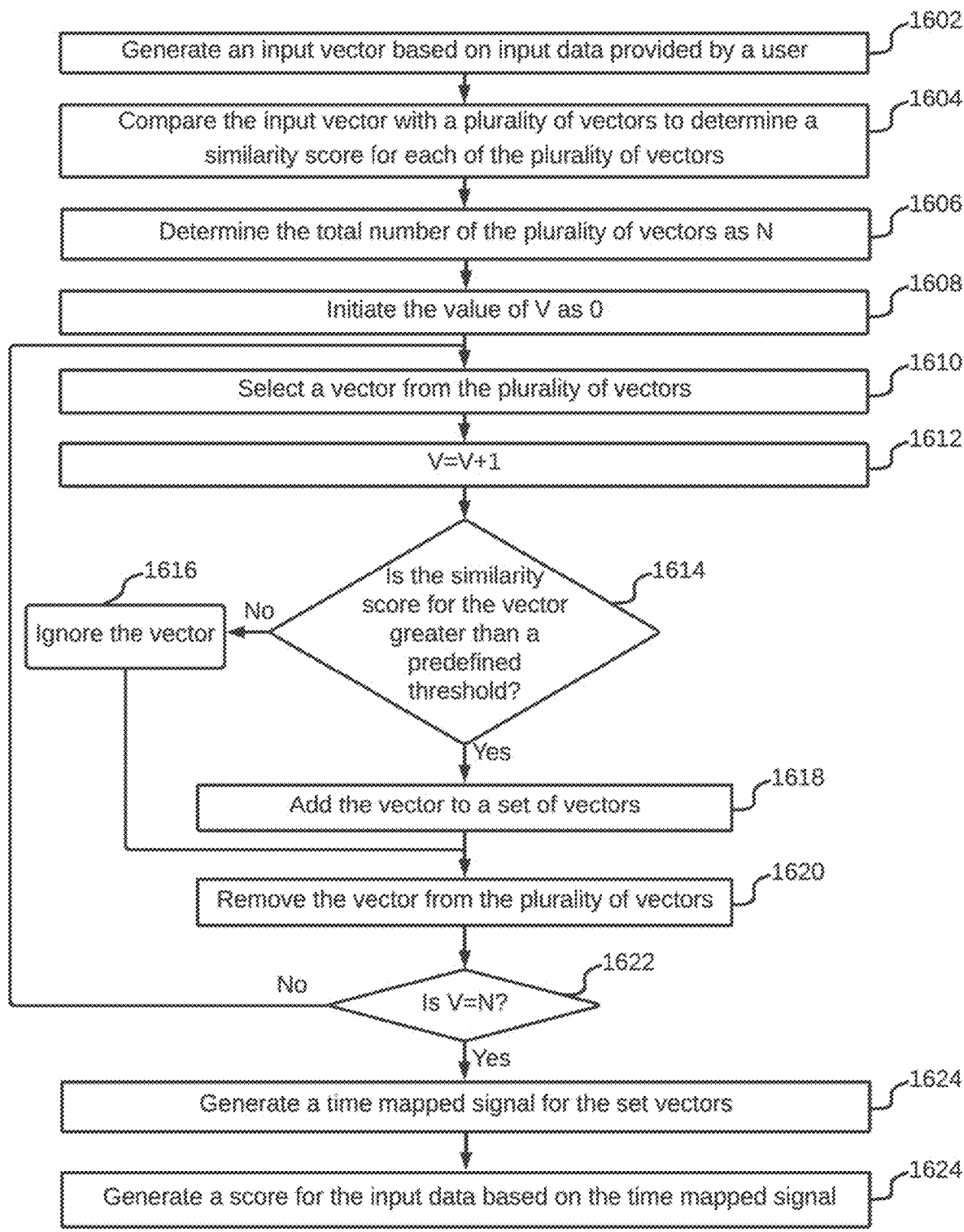
FIG. 16 illustrates a method for generating a heat score for an invention idea provided by a user, according to another embodiment of the present disclosure.

FIG. 16 illustrate a method 1600 for generating a heat score for an invention idea provided by a user, according to another embodiment of the present disclosure. At step 1602, an input vector is generated based on input data provided by a user. This has been explained with reference to FIG. 8. At step 1604, the input vector is compared with a plurality of vectors to determine a similarity score for each of the plurality of vectors with respect to the input vector. At step 1606, the total number of vectors in the plurality of vectors is determined as 'N.' At step 1608, value of a variable V is initiated at zero. At step 1610, a vector is selected from the plurality of vectors. At step 1612, the value of variable V is defined as "V=V+1." At step 1614, a check is performed to determine if the similarity score for the vector is greater than a predefined threshold or not. If the similarity score is less than or equal to the predefined threshold, the vector is ignored at step 1616. However, if the similarity score is greater than the predefined threshold, the vector is added to a set of vectors at step 1618. After executing the step 1616 and/or the step 1618, at step 1620, the vector is removed from the plurality of vectors.

At step 1622, a check is performed to determine whether the current value of the variable 'V' is equal to the value of 'N' or not. If the current value of the variable 'V' is not equal to the value of 'N,' the control of the method 1600 moves to the step 1610. However, if the current value of the variable 'V' is equal to the value of 'N,' at step 1624, a time mapped signal is generated for the set of vectors. At step 1626, a score is generated for the input data based on the time mapped signal. The score may be generated contemporaneous to the user providing the input data. The score represents current relevancy of the input data to the technology field associated with the input data. This has been explained with reference to FIG. 7 and FIG. 9.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A management system comprising: at least one processor; at least one memory coupled with the at least one processor, wherein the at least one processor and the at least one memory are configured to: receive a plurality of vectors for a plurality of signals from a plurality of data sources; extract a plurality of tags from the plurality of vectors based on frequency of occurrence of words associated with each of the plurality of tags within the plurality of vectors, wherein each of the plurality of tag is associated with one or more technology fields; assign a tag category from a set of tag categories to each of the plurality of vectors based on one or more of the plurality of tags associated with each of the plurality of vectors; assign a relevancy weight to each of the plurality of vectors based on an assigned tag category and a type of an associated data source of the plurality of data sources; determine a relevant time period associated with each of the plurality of vectors based on an assigned tag category and a type of an associated data source of the plurality of data sources; identify a primary vector and a set of secondary vectors from the plurality of vectors based on the relevancy weights assigned to each of the plurality of vector, wherein each of the set of primary vectors and each of the set of second vectors are associated with a technology field; generate a first time mapped signal for the primary vector based on the relevant time period determined for the primary vector; stack the set of secondary vectors based on the associated relevant time periods and relevancy weights to generate a second time mapped signal; and optimize the first time mapped signal based on the second time mapped signal.

2. The management system as recited in claim 1, wherein the at least one processor and the at least one memory are further configured to remove noise from the first time mapped signal by mapping the second time mapped signal to the first time mapped signal in order to optimize the first time mapped signal.

3. A method of generating a signal based on multiple signals, the method comprising: receiving a plurality of vectors for a plurality of signals from a plurality of data sources; extracting a plurality of tags from the plurality of vectors based on frequency of occurrence of words associated with each of the plurality of tags within the plurality of vectors, wherein each of the plurality of tag is associated with one or more technology fields; assigning a tag category from a set of tag categories to each of the plurality of vectors based on one or more of the plurality of tags associated with each of the plurality of vectors; assigning a relevancy weight to each of the plurality of vectors based on an assigned tag category and a type of an associated data source of the plurality of data sources; determining a relevant time period associated with each of the plurality of vectors based on an assigned tag category and a type of an associated data source of the plurality of data sources; identifying a primary vector and a set of secondary vectors from the plurality of vectors based on the relevancy weights assigned to each of the plurality of vector, wherein each of the set of primary vectors and each of the set of second vectors are associated with a technology field; generating a first time mapped signal for the primary vector based on the relevant time period determined for the primary vector; stacking the set of secondary vectors based on the associated relevant time periods and relevancy weights to generate a second time mapped signal; and optimizing the first time mapped signal based on the second time mapped signal.

4. The method of generating a signal based on multiple signals as recited in claim 3, wherein optimizing comprises removing noise from the first time mapped signal by mapping the second time mapped signal to the first time mapped signal.

5. One or more non-transitory machine readable medium having machine executable instructions configured to perform the machine implementable method for generating a signal based on multiple signals of claim 3.

* * * * *